United States Patent
Burke

(10) Patent No.: US 7,017,690 B2
(45) Date of Patent: Mar. 28, 2006

(54) PLATFORMS FOR SUSTAINABLE TRANSPORTATION

(75) Inventor: Robert J. Burke, Santa Cruz, CA (US)

(73) Assignee: ITS Bus, Inc., Santa Cruz, CA (US)

( * ) Notice: Subject to any disclaimer, the term of this patent is extended or adjusted under 35 U.S.C. 154(b) by 254 days.

(21) Appl. No.: 10/381,757

(22) PCT Filed: Sep. 24, 2001

(86) PCT No.: PCT/US01/29809

§ 371 (c)(1),
(2), (4) Date: Mar. 25, 2003

(87) PCT Pub. No.: WO02/26544

PCT Pub. Date: Apr. 4, 2002

(65) Prior Publication Data

US 2004/0012162 A1    Jan. 22, 2004

Related U.S. Application Data

(60) Provisional application No. 60/235,239, filed on Sep. 25, 2000.

(51) Int. Cl.
*B62D 61/10* (2006.01)
(52) U.S. Cl. ............... 180/24.07; 280/5.514
(58) Field of Classification Search ........... 180/22, 180/23, 24, 24.02, 24.06, 24.07, 14.3, 234, 180/236, 65.3, 65.6; 280/5.5, 5.504, 5.514, 280/785, 91.1; 296/178, 193.04
See application file for complete search history.

(56) References Cited

U.S. PATENT DOCUMENTS

| 3,405,778 | A |   | 10/1968 | Martin |
| 3,441,102 | A |   | 4/1969 | Kress |
| 3,452,702 | A |   | 7/1969 | Stemmons |
| 4,420,167 | A |   | 12/1983 | Winblad |
| 4,468,739 | A | * | 8/1984 | Woods et al. .................. 701/37 |
| 4,469,369 | A |   | 9/1984 | Belik |
| 4,596,192 | A |   | 6/1986 | Forster |
| 4,702,843 | A | * | 10/1987 | Oswald et al. ........... 280/5.507 |
| 4,783,089 | A | * | 11/1988 | Hamilton et al. ........ 280/6.157 |
| 4,981,309 | A |   | 1/1991 | Froeschle et al. |
| 5,342,023 | A |   | 8/1994 | Kuriki |
| 6,036,179 | A | * | 3/2000 | Rensel .................... 267/64.11 |

* cited by examiner

*Primary Examiner*—David R. Dunn
(74) *Attorney, Agent, or Firm*—Michael A. Glenn; Glenn Patent Group

(57) ABSTRACT

A vehicle utilize a cellular design to provide variously sized vehicles constructed from varying numbers of substantially identical cells. Each cell, fabricated from lightweight materials including composites, includes: compartment, floor section, sidewalls, roof, drive train, steering, brakes; and wheels coupled through axles and independent suspensions to the vehicle body, each suspension including a height adjuster, a flow-control shock absorber, and a rapid-response air spring for and exceptionally comfortable ride. The suspension system reduces structural requirements for the body. All-wheel steering lends the vehicle exceptionally high maneuverability. A hybrid power system combines an alternative fueled engine to power electricity generation and all-wheel electric drive with main energy storage in advanced battery technology. The cellular design and attendant weight reduction allow suspensions and drive trains to be substantially fabricated from light truck parts. A control system cooridnates and regulates the several sub-systems based on a variety of inputs.

81 Claims, 18 Drawing Sheets

Looking Forward

Side View

PLATFORMS FOR SUSTAINABLE TRANSPORTATION

This application claims the benefit of Provisional Application No. 60/235,239, filed Sep. 25, 2000.

BACKGROUND OF THE INVENTION

1. Field of the Invention

In general, the invention relates to the field of wheeled transportation. More particularly, the invention relates to lightweight, low-cost wheeled vehicles.

2. State of the Art

The population continues to increase, and at the same time, there is a continuing shift of population from small towns to major urban centers, exacerbating the highway congestion and urban sprawl that have characterized many large American cities since the mid-twentieth century. There is a growing belief that the favored mode of transportation, individually owned automobiles, imposes unacceptable environmental burdens and adversely affects quality of life. As a result of these forces, effective modes of urban mass transit have acquired a new priority. A sure sign of the new emphasis on providing effective vehicles and systems for urban mass transit is the rapidly increasing demand for urban transit buses. In just the United States, the current capital stock comprises at least fifty-five thousand separate vehicles; and the dollar value of annual purchases of new buses is well in excess of one billion dollars. The number of new units purchased is increasing at a rate of approximately ten to fifteen percent per year. While much of the increased demand has come from the public sector, the demand for efficient, cost-effective buses is increasing in private sector activities as well; for example, point-to-point shuttling, tourism, education, inter-city transit and recreation.

Along with the increased demand for buses, there are also emerging increased expectations, especially from public sector purchasers and regulators, of the vehicles themselves, leading to a demand for bus designs that reduce public sector costs related to roadway maintenance and repair, street and highway expansion and parking; while also ameliorating social costs related to noise pollution, air pollution, long commute times, while providing increased handicapped accessibility.

Even in the face of substantial government subsidies for development of new bus technologies, significant changes to conventional bus technology have been slow in coming. By and large, efforts to integrate new materials and power alternatives have been insufficient to address changing expectations of urban transportation managers and passengers, or to significantly reduce operating costs and initial purchase costs. However, dwindling petroleum reserves and an increasing concern about the greenhouse effect are creating a new sense of urgency. The prior art reveals many attempts to improve manufacturability of buses, decrease curb weight, increase maneuverability and safety, increase passenger comfort, and improve fuel efficiency.

Thus, several urban transit vehicles that employ modular construction techniques are described. For example, V. Belik, B. Kurach, Y. Trach, Module element of city bus or like vehicle and bus assembled on the basis of such module elements, U.S. Pat. No. 4,469,369 (Sep. 4, 1984) describe a module element for a city bus that is itself fabricated from a chassis unit, a door section, and a window section. The modules may be left-handed or right-handed. Different versions of the chassis unit are provided according to whether it is to function as a drive unit or a steering unit. Modules are assembled with front and rear elements and varying numbers of center sections to provide buses of varying size and capacity.

H. Förster, Universal vehicle system for the public local traffic, U.S. Pat. No. 4,596,192 (Jun. 24, 1986) describes a vehicle system for local public passenger transportation in which differing vehicle components are assembled to create vehicles of different size and capacity. Vehicles usable only on tracks, ones for use with or without tracks and ones for use only without tracks are possible.

L. Bergström, H. Eklund, J. Pettersson, Chassis for a bus, PCT Application No. SE94/01108 (Nov. 24, 1993) describe a bus chassis in which different versions of a front-end module are readily created by combining different front wheel modules and driver's compartment modules so that the height of the driver's compartment in relation to the rest of the bus varies.

However, none of the examples above contemplate the use of unconventional suspension systems to enhance ride quality and reduce load requirements, permitting the use of composite building materials and lightweight parts. Nor do they consider improving vehicle mobility and maneuverability through the provision of features such as all-wheel drive and all wheel-steering, or alternate power strategies such as hybrid power systems, or microprocessor control of the various vehicle subsystems.

D. Quattrini, A. Carlo, Electrically powered urban public transport vehicle with a floor at a reduced height, European Patent Application No. 90202043 (Aug. 11, 1989) describes an urban mass transit vehicle having a passenger compartment at a reduced height above the ground, with the wheels being located near the front and end regions. Each axle is provided with its own drive motor, providing all-wheel drive, allowing for optimal traction under adverse weather and road conditions. Additionally, all wheel steering is included to enhance maneuverability in confined spaces. Quadratttini, et al., don't however envisage the use of hybrid power systems, or unconventional suspensions that allow reduction of load requirements, permitting construction of a vehicle with composite materials, and lightweight off-the shelf parts. Moreover, they do not think of cellular body construction.

Municipality of Rotterdam, Manufacturing and implementation of a lightweight hybrid bus, www.eltis.org/data/101e.htm, describes a bus incorporating a modular light body system that allows identical building systems for different sized vehicles, a substantial weight reduction, and hybrid traction. There is no mention of what features in the construction are responsible for the weight reduction, nor are features such as all-wheel drive, all-wheel steering, improved suspension systems, or microprocessor control of vehicle subsystems considered.

L. Woods, J. Hamilton, Computer optimized adaptive suspension system having combined shock absorber/air spring unit, U.S. Pat. No. 4,468,739 (Aug. 28, 1984) and L. Woods, J. Hamilton, Computer optimized adaptive suspension system, U.S. Pat. No. 4,634,142 (Jan. 6, 1987) describe a vehicle suspension system in which a computer controls damping and spring forces to optimize ride and handling characteristics under a wide range of driving conditions. While a variety of suspension characteristics are achievable by programming the controller, there is no evidence that the suspension system described incorporates features that reduce load bearing requirements for the vehicle frame, allowing the vehicle to be manufactured from lightweight, off-the-shelf automobile or light truck parts. Furthermore, the described suspension provides no means of adjusting vehicle height relative to the roadway. And there is no suggestion that the suspension is appropriate for use in urban mass transit vehicles.

P. Eisen, All-wheel steering for motor vehicles, U.S. Pat. No. 5,137,292 (Aug. 11, 1992) describes an all-wheel steering arrangement having a coupler mechanism between the front and rear axles. There is no indication that the described arrangement is suitable for anything other than vehicles having two axles. What's more, the steering system is a simple, mechanical system. There is no provision for individual control of each axle a microprocessor or controller in a multi-axle vehicle.

There exists, therefore a need for an urban transit vehicle that:
  is affordable and easily manufactured;
  is lightweight;
  is highly maneuverable;
  provides exceptional passenger comfort;
  is energy-efficient; and
  minimizes or eliminates air and noise pollution commonly associated with buses.

It would be a significant technological advance to provide a cellular body construction, in which vehicles are constructed from identical components or cells, one cell including a passenger compartment, the associated floor, sidewalls, roof, an axle with drive train, wheels, suspension, steering and brakes. It would be advantageous to construct vehicles of varying size, simply by "bolting together" the required number of cells, easily allowing the manufacture of vehicles having any number of evenly spaced axles. It would be desirable to provide a suspension system in which each wheel has its own independent suspension, thereby providing greatly improved ride quality. It would be an advantage to configure the suspension system to permit reduced load carrying requirements on the vehicle frame, allowing the vehicle to be fabricated from lightweight, off-the-shelf parts and lightweight materials. It would be a great benefit to equip the vehicle with an energy-efficient, hybrid fuel system, so that reliance on increasingly scarce and environmentally unfriendly fossil fuels is greatly reduced or eliminated. It would also be desirable to equip the vehicle with all-wheel steering, thus permitting a much-reduced steering radius and allowing the vehicle to be easily maneuvered in city traffic as well as on narrow, residential streets. It would be advantageous to provide an advanced control system that integrated control of the steering, suspension, braking and power systems.

SUMMARY OF THE INVENTION

In recognition of the needs enumerated above, the invention provides a lightweight, highly maneuverable urban mass transit vehicle incorporating a cellular body design in which the vehicle is constructed from a varying number of substantially identical cells, fixedly assembled end-to-end to produce vehicles Of varying size and capacity. Each cell includes the passenger compartment, an associated section of floor, sidewalls, roof; an axle with drive train, wheels, suspension, steering and brakes. The body portion of the cells is fabricated from durable, lightweight materials such as composites or advanced steel products, greatly reducing the weight of the finished vehicle, which allows substantially increased fuel economy, and greatly reduced wear and tear on roadways. The invented vehicle has a multi-axle configuration, each cell having an axle, so that a typical vehicle has at least three axles preferably evenly spaced. A novel multi-axle suspension system, in which independent suspensions couple wheels at each end of each axle, incorporates innovations that provide an exceptionally stable, smooth ride. Among these novel features are:
  a height adjuster that allows the height of the vehicle over the roadway to be adjusted, providing passage over large bumps and dips in the road, facilitating passenger boarding, and allowing the passenger compartment of the vehicle to be made level in places where the roadway is not, such as on a crowned road;
  an active air spring system greatly reduces the bump force when a wheel is raised by going over a bump in the road; and
  a drop-stop active shock absorber that damps the downward motion of a wheel into depressions in the roadway, providing resistance for up to the full force of the compressed spring.

Providing multiple pairs of suspensions, preferably closely and evenly spaced, reduces the load requirements for the body, allowing the use of lightweight stock parts, such as those for light trucks and SUV's, thus reducing further the necessary weight of the vehicle and substantially reducing manufacturing and repair costs.

An all-wheel steering system provides the vehicle exceptional maneuverability, also allowing the vehicle to be maneuvered in ways previously unavailable such as crab mode, for parking in tight spots, or pivot mode. Along with the suspension, power and braking systems, control of the steering system is mediated through a microprocessor-based command and control system.

A hybrid power system combines an alternative fueled engine to power electricity generation and all-wheel drive with main energy stored in a number of storage batteries.

DETAILED DESCRIPTION

Figure 1A:
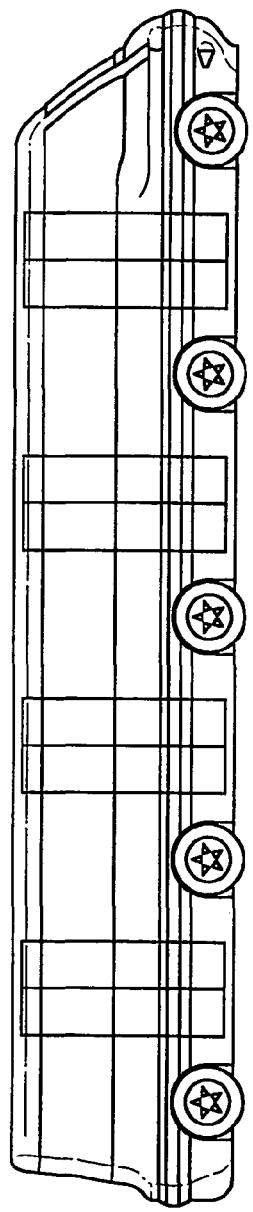
FIG. 1 shows an urban mass transit vehicle provided in a variety of sizes according to the invention.
Figure 1C:
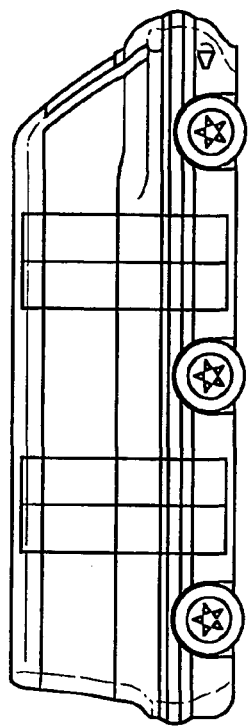
Figure 1B:
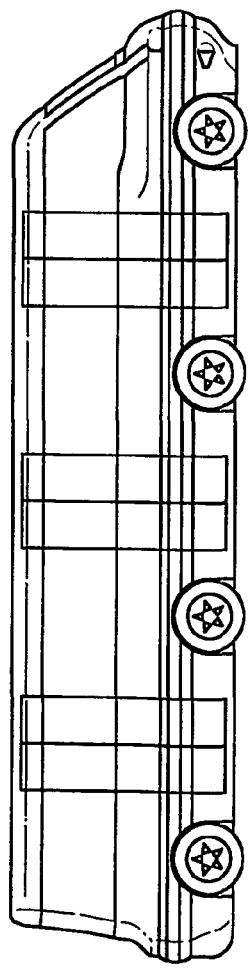
Figure 1D:
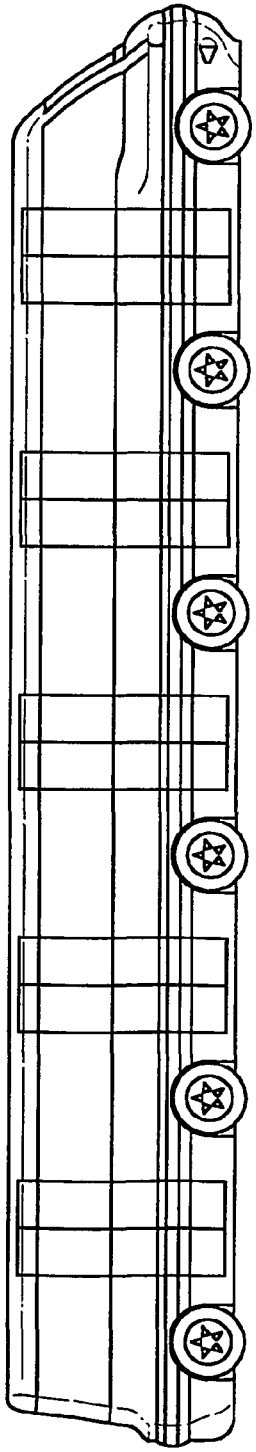

The current state of metropolitan transportation is problematic. As populations continue to grow, automobile transportation becomes increasingly difficult to sustain. The cost of building and maintaining highways, coupled with other problems such as long commute times, air pollution and dwindling petroleum reserves renders public transportation increasingly attractive. Unfortunately, because of land use decisions based on automobile transportation and its accompanying economics—typified by low-density suburban residential development, diffuse low-rise commercial development, and scattered development not easily accommodated in public transportation planning—effective solutions have been difficult to identify. Partly because of social factors such as a disinclination to use public transportation and problems with the medium itself, buses and related transit systems have not significantly increased the portion of the population using public transportation.

The invention provides a solution that radically changes both the economics of bus transportation and addresses many of the social factors that limit it. Referring now to FIGS. 1a–d, an urban mass transit vehicle is shown that incorporates a number of advantageous features:

DETAILED DESCRIPTION

The current state of metropolitan transportation is problematic. As populations continue to grow, automobile transportation becomes increasingly difficult to sustain. The cost of building and maintaining highways, coupled with other problems such as long commute times, air pollution and dwindling petroleum reserves renders public transportation increasingly attractive. Unfortunately, because of land use decisions based on automobile transportation and its accompanying economics—typified by low-density suburban residential development, diffuse low-rise commercial development, and scattered development not easily accommodated in public transportation planning—effective solutions have been difficult to identify. Partly because of social factors such as a disinclination to use public transportation and problems with the medium itself, buses and related transit systems have not significantly increased the portion of the population using public transportation.

The invention provides a solution that radically changes both the economics of bus transportation and addresses many of the social factors that limit it. Referring now to FIGS. 1a–d, an urban mass transit vehicle is shown that incorporates a number of advantageous features:

Cellular body construction allowing vehicles of various sizes and capacities to be built using identical parts. Drive motors, suspensions, control systems engines and generators, virtually every component, are the same for small buses and large, reducing part inventories, mechanic and operator training and repair time.

Multiple independent suspensions reduce the load-carrying requirements of the frame so that the overall weight of the vehicle may be reduced; also reducing load requirements of each suspension, permitting the vehicle to be fabricated from off-the-shelf auto or light truck parts; and greatly stabilizing handling characteristics of the vehicle.

Computer control of braking and suspension syst ms, permitting limousine-quality ride without the porpoising and swaying of traditional buses.

Hybrid power system that combines an alternative-fueled engine for electricity generation and all-wheel electric drive with main energy storage in advanced chemical batteries and regenerative braking to recover kinetic energy. Along with the substantial reduction in weight, the power system significantly improves fuel economy, also eliminating the need for a bulky transmission, and providing improved driving characteristics.

Construction from lightweight materials, providing low maintenance and long vehicle life, and permitting use of advanced load-bearing designs and lower-cost fabrication techniques. Materials may b e composite, or they may be advanced, lightweight metal products.

Weight/capacity advances, permitting vehicle configurations that improve payload to empty vehicle weight ratio of a 40–50 person bus from approximately 60% to approximately 150% at maximum payload, and providing extraordinary fuel efficiency.

Computer-mediated all-wheel steering, permitting much reduced turning radius, as well as "crab" and "pivot" turning.

Flexible seating configurations, allowing operators to increase or decrease the passenger seating capacity and configuration readily.

Multiple doors with option for compartmented interiors, offering a European train compartment feel and rapid entry, seating and exit.

Low floor with multiple door ingress/egress with curb-level walk-on access that exceeds ADA standards.

Automobile quality interiors with options.

As FIG. 1 shows, vehicles of different sizes and capacities are provided. FIG. 1a shows a vehicle having five axles; 1b, a four-axle vehicle; 1c a three-axle vehicle and finally, a vehicle having six axles is shown in FIG. 1d. As mentioned above, the body of the vehicle is fabricated, at least in part, from composite materials, such as fiberglass, graphite/epoxy or metal matrix composites. By replacing conventional materials with lightweight alternatives, such as composites and advanced metal products, it is possible to save weight and energy, reduce part count and assembly cost and to meet structural requirements that cannot be fulfilled using conventional materials.

Figure 2:
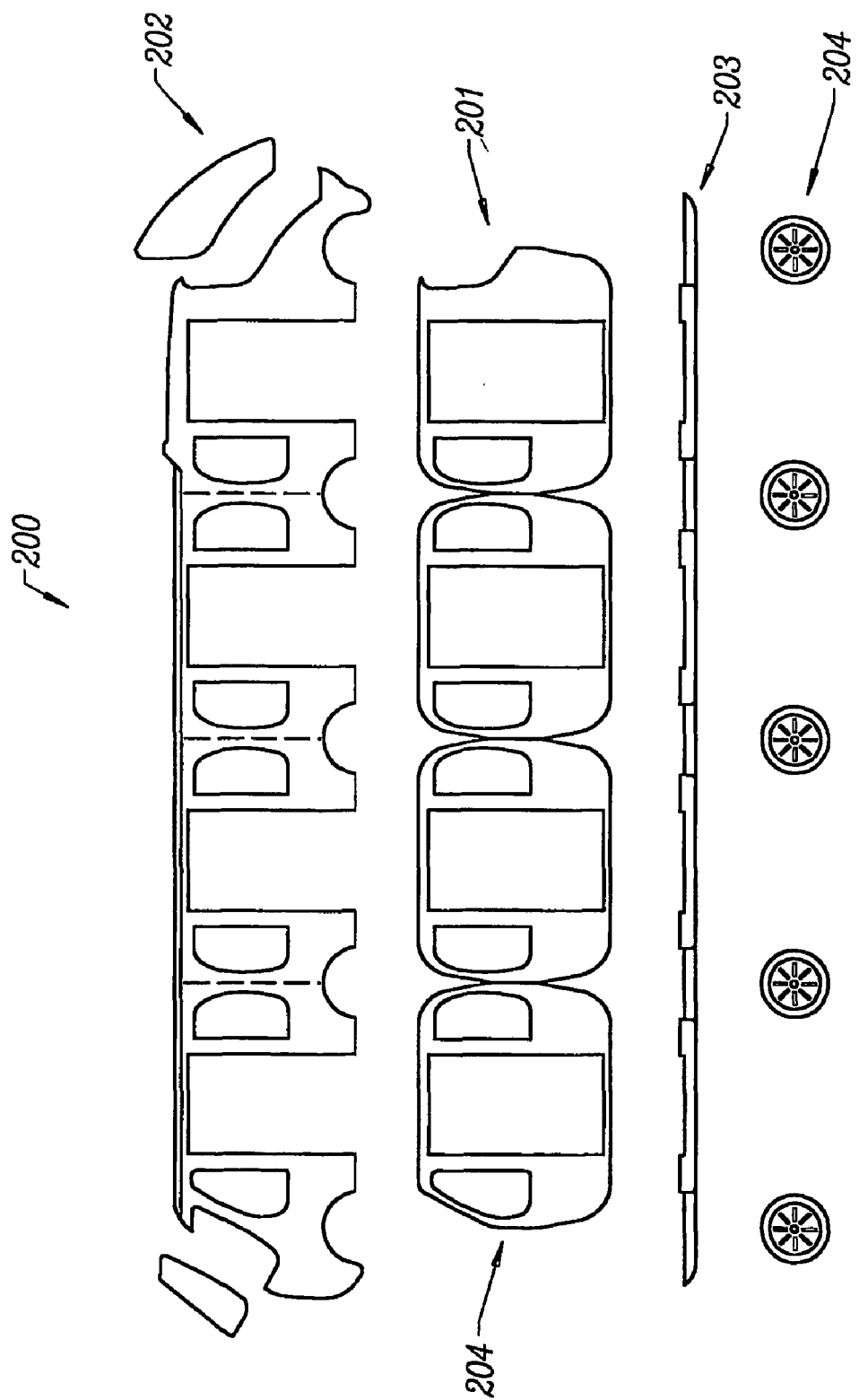
FIG. 2 is an exploded view of an urban mass transit vehicle as in FIG. 1, constructed from a plurality of cells according to the invention.
Figure 5A:
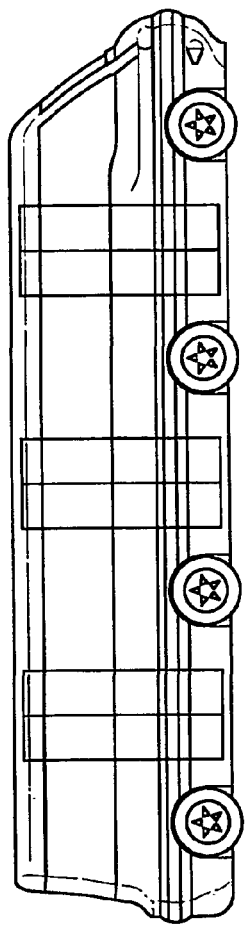
FIG. 5 shows the manner of assembling vehicles of different sizes by combining different numbers of identical body cells according to the invention.
Figure 5B:
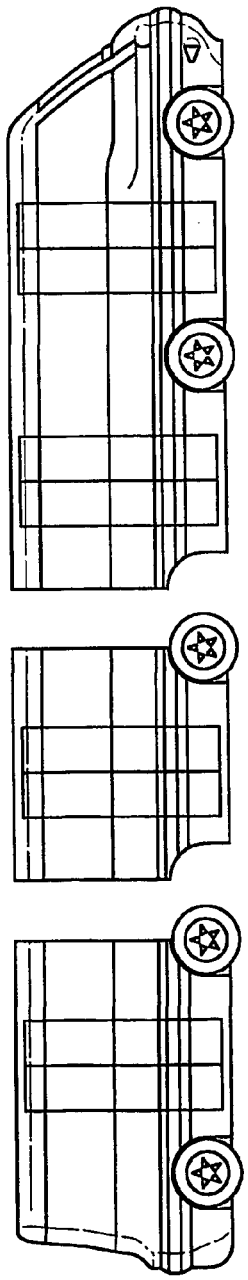
Figure 5C:
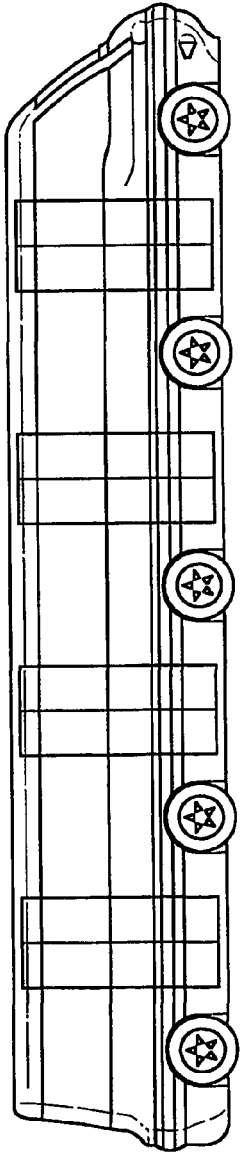

FIG. 2 provides an exploded view of the invention that illustrates the construction of the vehicle from substantially identical cells. A central feature of the invention is the composition of a bus of a given length from a specific number of cells. Accordingly, four compartments 201 are provided, corresponding to four cells. As shown, the end compartments are modified to provide front and end units. Four exterior units 202 are shown, and four floor sections 203. Five axles. 204 with wheels coupled at each end are shown. Thus, one cell has two axles, while all remaining cells have one. In general, the end cell 204 is equipped with two axles, although the front cell could just as easily have two axles. For purposes of illustration, the various components of a cell have been shown separately. However, in actual practice, one cell includes a compartment, the associated section of floor, sidewalls, roof; one axle with drive train, wheels, suspension, steering and brake assemblies, all pre-assembled to form a single unit. Construction of a vehicle essentially involves fastening together the required number of cells to produce a vehicle of the required length and capacity, as illustrated in FIG. 5. Thus, FIG. 5*a* shows a vehicle having three cells, while FIG. 5*b* shows the addition of a cell to the three-celled vehicle, resulting in the four-celled vehicle shown in FIG. 5*c*. The cells are fastened together using fasteners such as bolts or rivets or alternatively, using bonding materials. In the preferred embodiment of the invention, the cells are permanently fastened together to produce a rigid vehicle of a fixed size. However, an embodiment is possible in which the cells are removably fastened together, allowing vehicles to be alterably configured.

Figure 3:
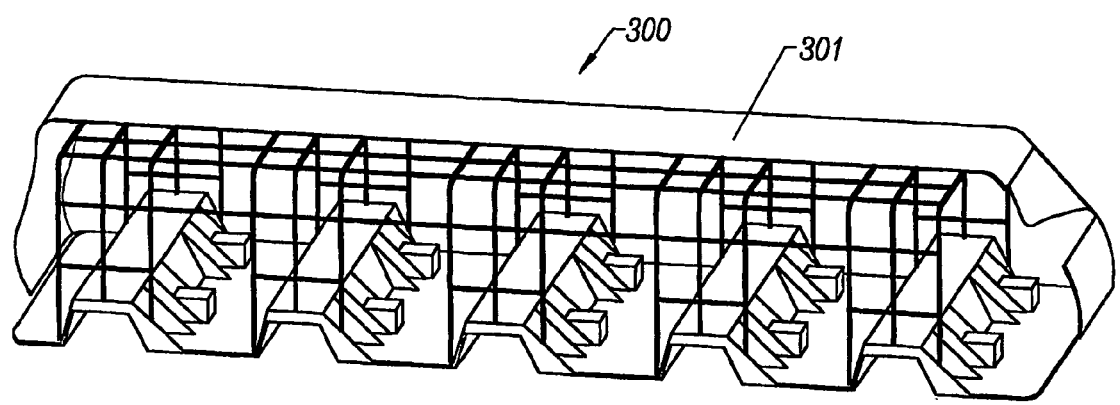
FIG. 3 is a skeletal view of the body of an urban mass transit vehicle as in FIG. 1, showing the body frame according to the invention.

FIG. 3 provides a view of an assembled vehicle 300 minus axles and wheels, with a portion of the exterior cut away to reveal the frame. In the preferred embodiment of the invention, a lightweight frame is provided. The material for the frame may be a composite, or a lightweight metal product, such as aluminum. As described above, providing multiple independent suspensions, with a narrow span between axles, offers distributed support for the vehicle body, greatly reducing the load-carrying requirements of the frame and allowing it to be extremely lightweight. It should be remembered that the frame is incorporated into the individual cells, so that the frame shown in FIG. 3 was achieved by bolting four cells together.

Figure 4:
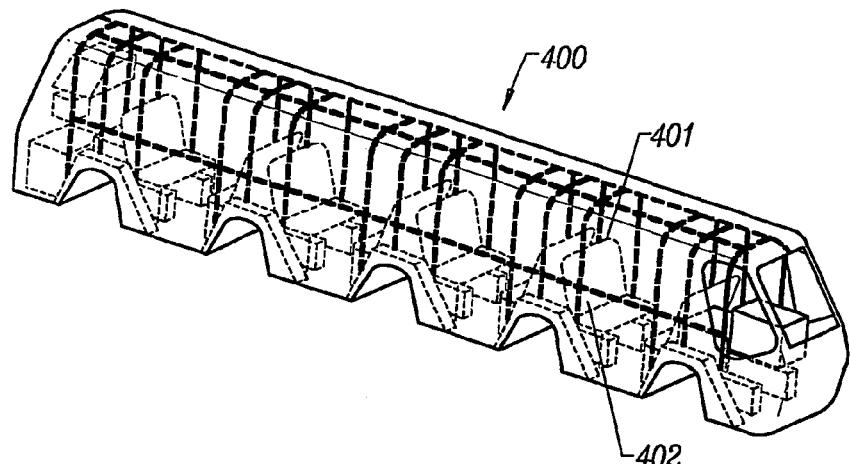
FIG. 4 shows the vehicle body of FIG. 3 equipped with passenger seating and a sunroof according to the invention.

FIG. 4 shows an assembled vehicle body with an exterior sunroof 401. Other embodiments having a solid roof with no sunroof are also possible. The vehicle 400 is also equipped with passenger seating 402. As previously described, the passenger seating is highly configurable, so that the seating capacity is readily increased or decreased. The smallest buses can have 14–20 seats and larger ones can have 45–55 seats. Seating can be provided in a conventional center aisle configuration, or in compartmented sections combined with center aisle sections. As previously indicated, automobile quality interiors permit the provision of a high level of passenger comfort, including individual seats, sound-deadening body and frame and insulation, and a compartment seating option.

Suspension

Figure 6A:
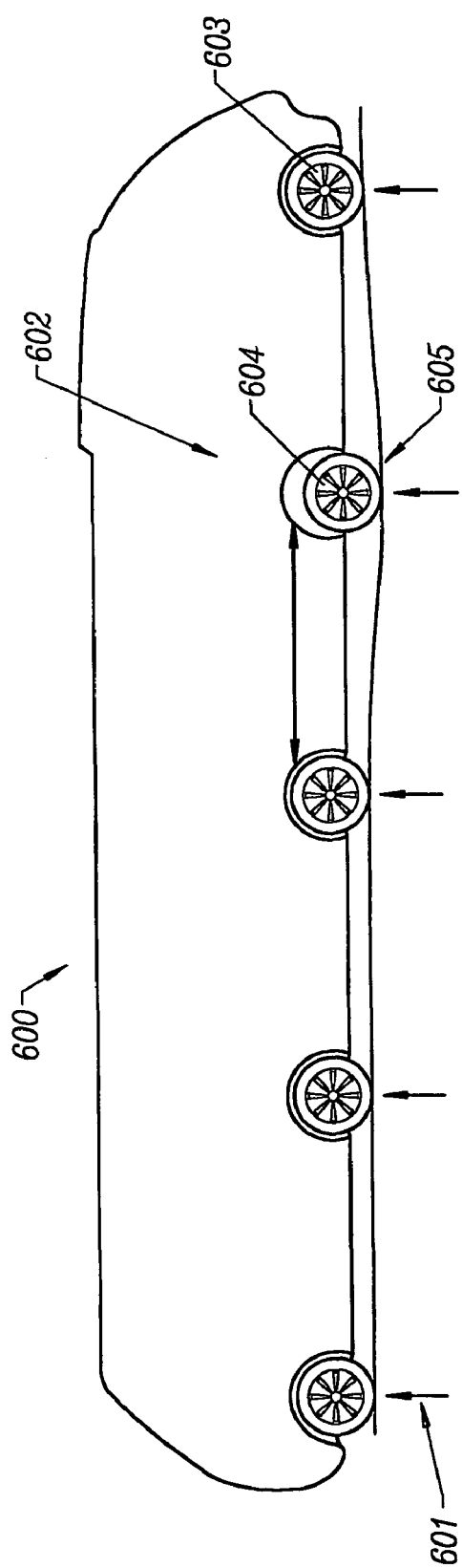
FIG. 6 illustrates the beneficial effects on ride quality achieved by providing independent, computer controlled suspensions on a rigid, multi-axle urban mass transit vehicle as shown in FIG. 1 according to the invention.

Referring now to FIG. 6, FIG. 6*a* shows a side elevation of a vehicle having five axles, in which each wheel 603 is coupled to its respective axle by means of an associated independent suspension. The multiple independent suspensions are positioned such that the span between two adjacent suspensions, indicated by arrow 602, is greatly reduced. Compared to conventional buses having two-axle or tandem-axle configurations, the current arrangement provides a number of important advantages. The narrowly- and evenly-spaced suspensions provide evenly-distributed support, indicated by arrows 601, to the vehicle body across the entire length of the vehicle, as opposed to only providing support at either end, as is usual in conventional bus vehicles. The distributed support is an important factor in providing exceptional ride stability. Thus, as the vehicle negotiates a dip 605 in the road, the evenly-spaced suspensions, coupled with the vehicle's rigid structure, transfers the load from the wheel 604 to the remaining wheels such that the vehicle stays level through the dip, eliminating the "porpoising" commonly experienced as buses traverse dips in roadways. Furthermore, novel active suspension elements, including height adjusters which move individual wheels up and down relative to the vehicle body, air springs with rapidly variable stiffness, and shock absorbers with capability to prevent dropping a wheel into chuckhole (for example) allow an exceptionally smooth ride as the vehicle encounters irregularities in the road surface. The distributed support provided by the multiple suspensions reduces the load carrying requirements of the vehicle structure, allowing the structure to be constructed with an extremely light design, using advanced material, as described above. Because load requirements of each suspension are greatly reduced, the vehicle suspension can be constructed from "off-the-shelf" automobile or light truck parts.

Figure 6D:
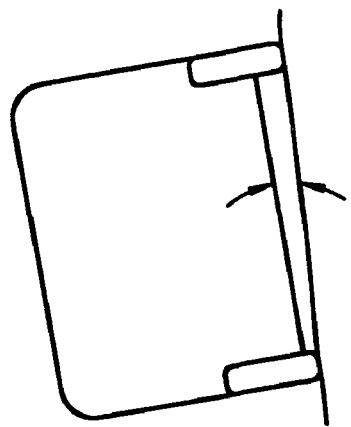
Figure 6C:
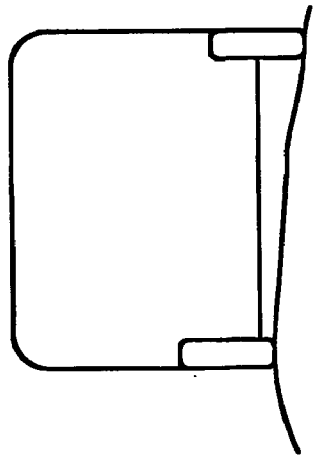
Figure 6B:
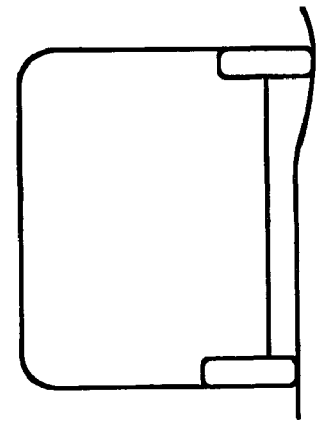

FIGS. 6*b*–6*d* illustrate the beneficial effect provided by including a height adjuster, described in greater detail below, as a component of each suspension. Under computer control, the height adjuster adjusts the height of each wheel relative to the body on a relatively slow time scale, maintaining all wheels in contact with the road and allowing the vehicle to negotiate large dips or large humps in the roadway. By adjusting the height of one side of the vehicle relative to the other, the passenger compartment can be made level in places where the road is not, thus preventing the vehicle from wallowing in a road depression as in FIG. 6*b*, and allowing it to remain level on a crowned road, as in FIG. 6*c*. Additionally, the height adjuster can allow the vehicle to lean into turns on the highway, as shown in FIG. 6*d*.

Figure 7:
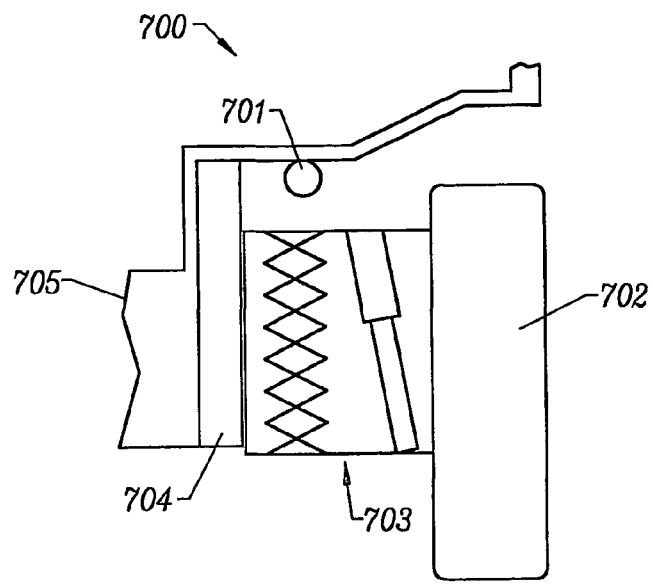
FIG. 7 provides a schematic view of an individual suspension and associated parts for one wheel according to the invention.

FIG. 7 provides a schematic diagram of a single suspension and associated parts for one wheel vehicle suspension. The suspension includes:

a ride bumper 701;

rotating elements 702, including at least a wheel, a tire, the rotating element of a wheel motor with bearing part, and the rotating element of a brake assembly;

non-rotating elements 703, including at least a control arm, spring, shock absorber, stabilizer, steering actuator and linkage, the fixed elements of brake and brake actuator, parts to mate with height adjustor assembly that is fixedly attached to the body or frame of the vehicle, the fixed element of the wheel motor with a bearing part, which also performs the function of an axle, mechanical structure and bearings/bushings as needed;

a height adjustor assembly 704, including mating plates, guides, bearings, actuator, mechanical structure fixedly attached to vehicle body/frame; and vehicle body/frame structure 705 (integrating structure for floor, bulkhead, battery box and seat.

The individual suspension components are described in greater detail further below.

Figure 8:
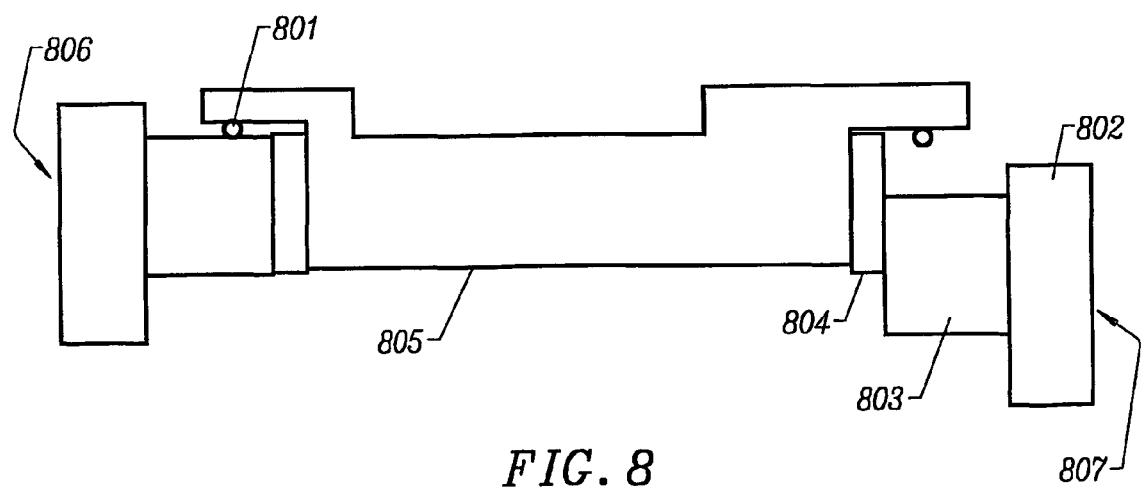
FIG. 8 provides a schematic view of a vehicle structure incorporating independent suspensions according to the invention.

Referring now to FIG. 8, a schematic diagram shows how the independent suspensions integrate with the vehicle body/frame. The components listed above are shown in relation to the vehicles structural components:

ride bumper 801;
rotating elements 802;
non-rotating elements 803;
height adjustor 804,
body frame/structure 805.

The view provided in FIG. 8 is that looking toward the front of the vehicle. Thus, the left suspension 806 is shown with the wheel in its highest position relative to the body, and the right suspension 807 is shown with the wheel in its lowest position relative to the body.

Figure 9:
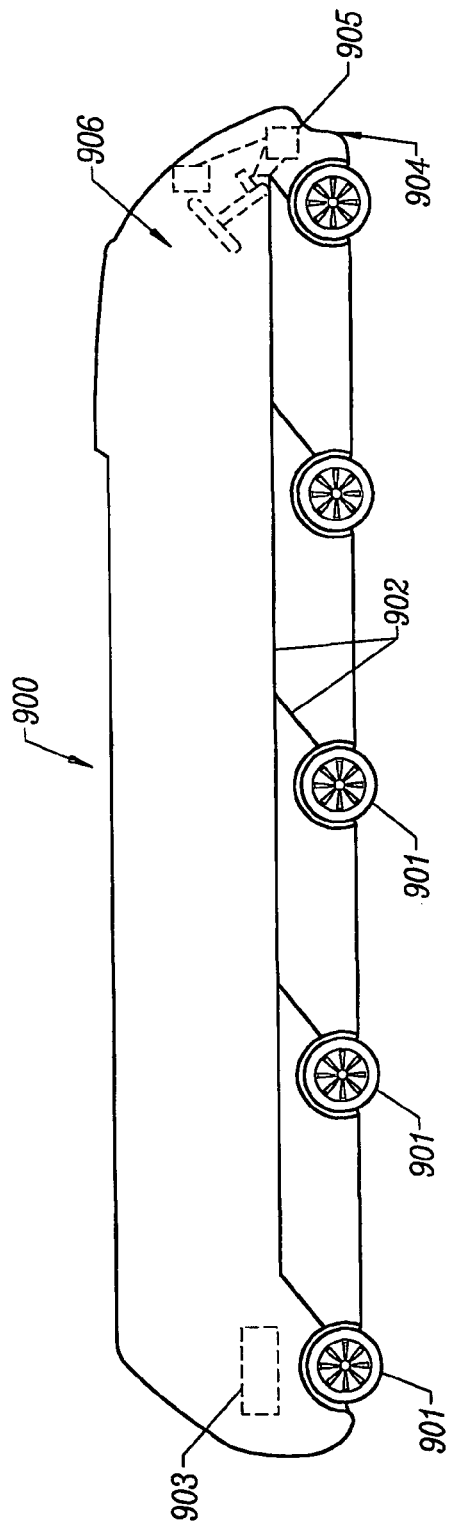
FIG. 9 is a side elevation showing the integration of the suspension of FIG. 8 into an overall vehicle structure according to the invention.

FIG. 9 provides a side elevation of a vehicle illustrating how the suspension system is integrated into the overall vehicle. As described in greated detail below, the suspension is processor-controllable, and accepts input from different sources. As described above, individual, independent suspensions 901 are provided for each wheel including:
  tire;
  wheel
  axle;
  height adjustor assembly;
  spring;
  shock absorber;
  mechanical support;
  sensors for suspension configuration;
  sources of actuation force: hydraulic, pneumatic, and electrical; and
  stabilizer and ride bumper.

Figure 18:
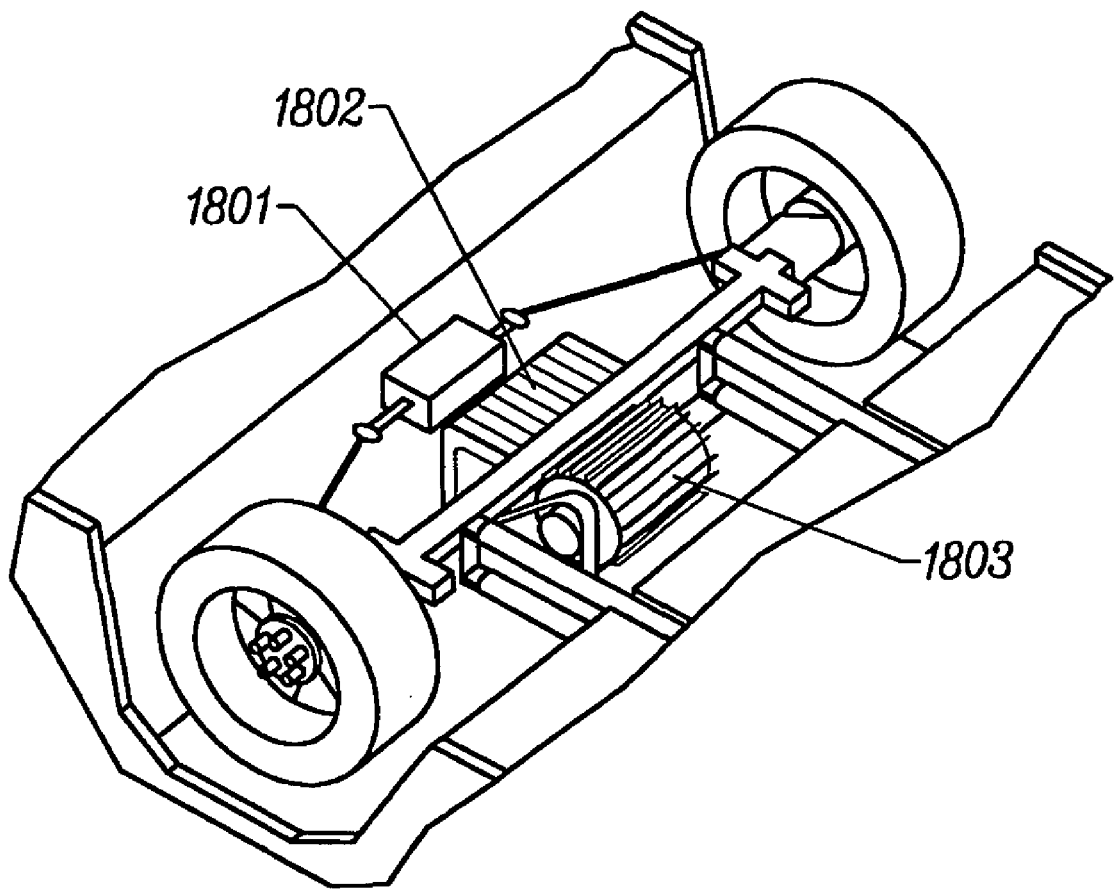
FIG. 18 illustrates an axle with attached steering actuator mounted in a wheel well according to the invention.

One or more units 903 provide the actuation forces described above to the individual suspensions. Cabling 902 is provided for signal and electrical current transmission. In its preferred embodiment, the invention incorporates a wheel motor as described above for each wheel, the axle being integrated with the wheelmotor. An alternative embodiment of the invention provides a continuous axle as shown in FIG. 18, with a single drive motor for each axle. In the case of a continuous axle, the wheel assembly also includes a drive shaft, described further below. Control of the suspension is mediated through a microprocessor or controller 905, in concert with a signal processor element. Inputs to the suspension control system include those from the sensors already described, plus a road control sensor 905 and an operator interface 906.

Height Adjuster

Figure 10:
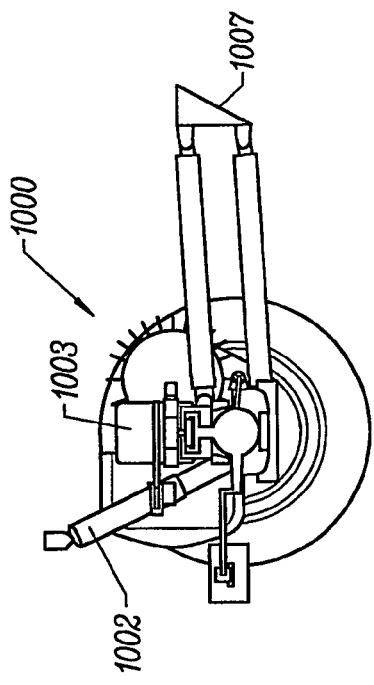
FIG. 10 illustrates a height adjuster from the suspension of FIG. 7 according to the invention.

FIG. 10 provides a detailed illustration of the height adjuster system 1000 mentioned above. An important requirement of the vehicle suspension system is that each wheel moves up and down independently of all other wheels. This need is satisfied by providing trailing four-bar linkages 1007, actuated by pistons 1002. As FIG. 7 shows, the height adjustor linkage attaches to the floor of the vehicle, allowing the axle to move up and down when actuated. The preferred embodiment of the invention utilizes hydraulic pistons; however, a pneumatic piston would also be suitable. The four-bar linkage keeps the axle and all that is attached to it vertical without any tilting. The height adjustor system may also include a ride bumper 1003.

Air Spring

Figure 11A:
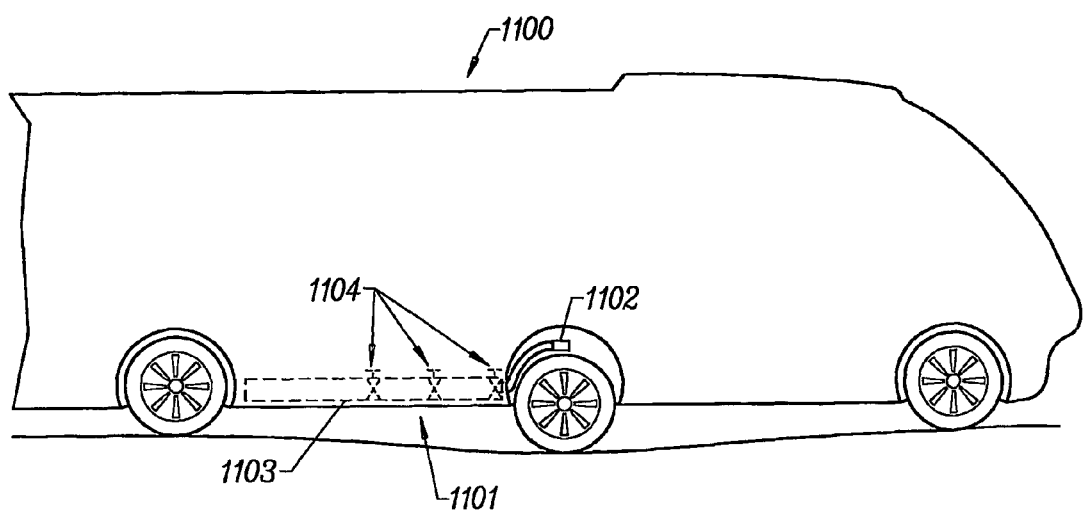
FIG. 11 illustrates a rapid-response, variable stiffness air spring from the suspension of FIG. 7 according to the invention.
Figure 11B:
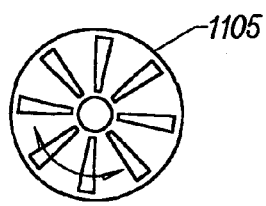

As shown in FIG. 7, the vehicle suspension includes an active air spring system. FIG. 11 shows a side elevation of a vehicle 1100 that includes an active air spring system 1101 as a suspension component. As previously mentioned, the suspension for each wheel moves up and down in relation to the vehicle body, with the body essentially remaining level and stationary. The height adjusters previously described provide the bulk of this vertical motion, particularly for the relatively slow operations described above, e.g., negotiation of large humps and dips, operation on crowned roads, and tilting into turns. In addition, the air spring has a long-stroke to smoothly accommodate substantial vertical wheel at higher rates of vertical travel. Because the action of the air spring is based on flow control and does not involve lifting the vehicle or working against dynamic loads, the air spring system is highly energy-efficient. The essential operating principle of the air spring system is that the body of the air spring 1102 communicates with a plenum 1103 through one or more progressive, fast-acting valves 1104. As shown in FIG. 11*b*, progressive valves 1104 are adjusted through the action of valve plates 1105 (FIG. 11*b*) rotated by a common shaft with cams at angular intervals. As more of the progressive valves are fully opened, the total volume of the air spring system is increased. Conversely, the more valves that are completely closed, the more the volume of the spring system is decreased. Spring stiffness is inversely related to the available volume within the system. Accordingly, with all valves closed, the spring has its maximum stiffness. Changing the spring stiffness does not itself change the force exerted by the spring. Thus, the air spring may best be characterized as a variable-constant air spring. The effect of making the spring softer is that as a wheel traverses a bump and the road lifts the wheel and compresses the spring, less added force (i.e., a smaller "bump") is felt where the spring pushes up on the body. In actual practice, the air spring system can reduce bump force by a factor of five to ten. Additionally, the design of the air spring system allows it to be exceptionally fast acting, thus responding very rapidly relative to the time scale on which a change in spring stiffness must be implemented to respond to individual features of the road surface and optimize ride quality.

Active Shock Absorber

As FIG. 7 shows, the suspension further includes an energy-efficient, active shock absorber. The primary novel objective of the shock absorber is to slow or stop the violent vertical drop of a wheel into a sharp depression such as a chuckhole. As with the air spring just described, the shock absorber derives its energy-efficiency from the fact that its action does not involve doing work against the weight of the vehicle or dynamic loads, but instead involves control of fluid flow within the element by means of a fast-acting valve. Thus, the energy requirement is only that required to operate the valve.

Figures 12A, 12B:
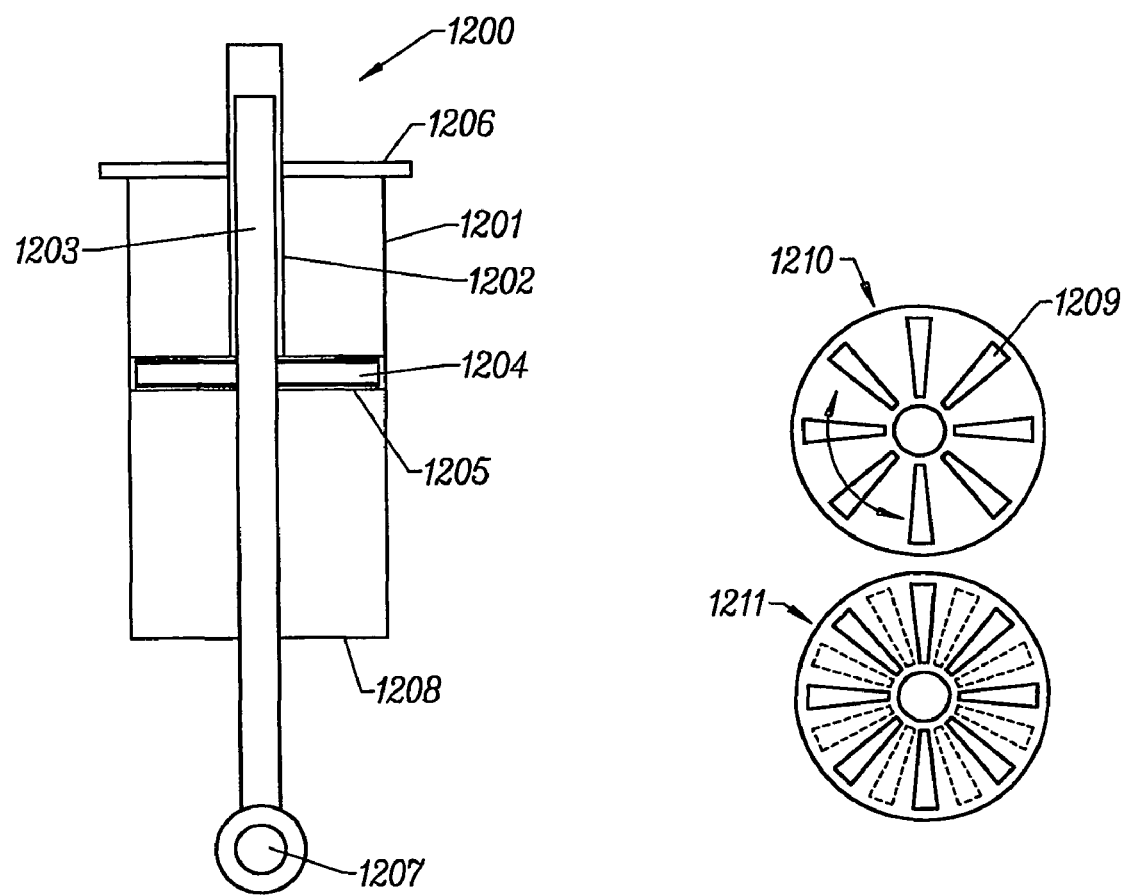
FIG. 12 illustrates a drop-stop active shock absorber from the suspension of FIG. 7 according to the invention.

FIG. 12 shows the shock absorber 1200 in greater detail. The shock absorber includes a hydraulic fluid canister 1201 mounted to the top bearing plate 1206 of the spring. The mount has sufficient strength to cage the force of the fully loaded spring. The first end of a shaft 1203 is attached 1207 to the lower bearing plate of the spring. The other end of the shaft is received by a central opening on the lower face 1208 of the canister 1201 and traverses the volume of the canister axially to be received by a valve stem 1202 that concentrically surrounds the shaft 1203. A pusher plate 1204 is concentrically attached to the shaft such that the pusher plate is stationary and incapable of rotating. The pusher plate 1204 is enclosed within a valve plate assembly 1205, the valve plate assembly being continuous with the valve stem 1202. The valve stem emerges from a central opening in the top surface of the canister 1201 to be received by an actuator (not shown). It should be noted that the openings on both faces of the hydraulic canister are provided with fluid-tight seals to prevent the escape of hydraulic fluid from the canister and an attendant loss of pressure within the canister. Enclosure of the pusher plate 1204 within the valve plate assembly 1205 is achieved by sandwiching the pusher plate between two valve plates, upper and lower. Both the valve plates and the pusher plate are provided with openings 1209 (FIG. 12*b*). The valve plates are stationary with respect to each other, with the openings 1211 of each valve plate being aligned, and the two valve plates are stationary with respect to the valve stem 1203. The entire valve assembly, consisting of the valve stem 1202 and the valve plate assembly 1205, rotates freely with respect to the pusher plate 1204 and the shaft 1203, which remain stationary. Thus, the openings of the valve plates and the pusher plate may align 1210, either fully or partially, or they may be offset from each other 1211.

It may be seen that the combined pusher plate 1204 and valve plate assembly 1205 divide the hydraulic canister into two compartments. When the openings of the valve plate assembly 1205 and the pusher plate 1204 are aligned, fluid flow between compartments is permitted, according to the degree of alignment of the openings, and when the openings are offset, fluid flow between the compartments is prevented. Thus, by permitting fluid flow from one compartment to the other, the valve plates and pusher plates are allowed to move through the fluid in a piston-like fashion, as the associated spring is compressed or elongates. When fluid flow is completely obstructed by completely offsetting the openings of the valve plate assembly and the pusher plate, the shock absorber is stoppered and movement of the plates prevented. Accordingly, a variable amount of shock absorption is provided, determined b y the degree of alignment of the openings.

As mentioned above, the valve stem is connected to an actuator. The actuator rotates the valve stem to set the alignment of the openings in the valve and pusher plates in response to input from the control system. It should be remembered that the suspension itself moves up and down in relation to the vehicle body, with the body remaining essentially motionless and level. The goal of providing the air spring and the shock absorber in the present configuration is to damp the upward and downward motion of each wheel, independent of all other wheels. Thus, closing the openings between the plates to retard fluid flow and restrict movement of the plates within the canister damps downward motion of the wheel in the following manner when the pusher plate and valve plate alignment stops fluid flow, the plates push on the captured volume of fluid, pushing on the bottom of the container, thus resisting the force of the spring and the force of gravity on the wheel assembly.

The damping action of the shock absorber can be quickly optimized to best handle the particular features of the roadway surface, with shallow depressions invoking lesser responses in the damping action and chuckholes invoking complete stoppering. Unlike the requirement of a two-axle vehicle to be supported at all times at all four ends of the two axles, the invented multi-axle suspension allows one wheel temporarily to not support its full share of the vehicle weight, and the vehicle remains stably supported by the remaining wheels. An important difference between the current shock absorber and other active shock absorbers is that the action of transiently holding a wheel back from full contact with the road involves the resistance of the full force of the compressed spring.

Ride Bumper

As shown in FIG. 10, a ride bumper 1003 is provided that sits between the vehicle body and the axle during normal operation. The bumper is provided to maintain the axle at its required height in the event that the height adjuster fails. Also, the bumper can reduce wear on the height adjustor by supporting the axle at times when the height adjustor is unnecessary.

Control

Control of the height adjuster, the air spring and the active shock absorber is through a hierarchy of sensors with operator inputs involved only at the highest and lowest level. The active shock absorber activates via the computerized suspension control in response to a combination of information regarding rapid vertical acceleration of a wheel, rapid change of the vertical force on a wheel, and information from a road contour sensor. An optional operator input can alert the computerized suspension to an approaching road surface imperfection.

Steering

Figure 13A:
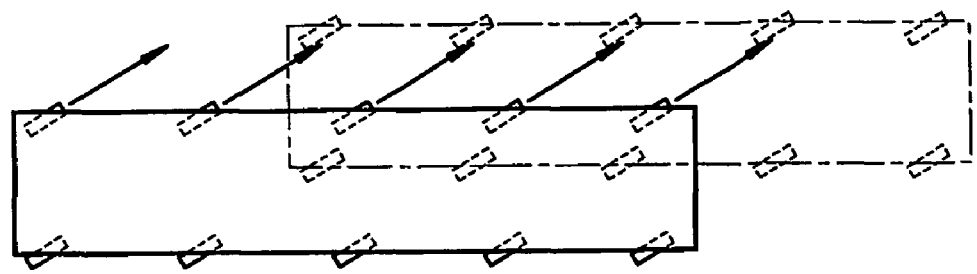
FIG. 13 provides plan views of an urban mass transit vehicle equipped with all-wheel steering in crab, pivot and track modes, respectively, according to the invention.
Figure 13B:
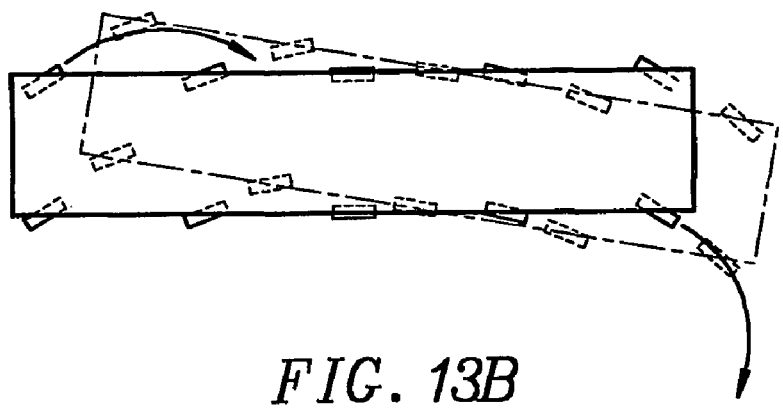

As mentioned earlier, it is necessary for urban transit vehicles to be easily maneuvered in a variety of restrictive settings: heavy urban traffic, narrow residential streets, and sharp corners requiring a narrow turning radius. For this reason, the invented vehicle is equipped with an all-wheel steering system that provides several steering modes. All-wheel steering allows the vehicle an exceptionally small turning radius relative to the vehicle size, rendering it highly maneuverable in the restrictive environments likely to be encountered in urban settings. In addition, as shown in FIGS. 13*a* and 13*b*, other steering modes are provided: crab mode (FIG. 13*a*) and pivot mode (FIG. 13*b*). Crab mode is particularly useful for maneuvering the vehicle into and out of tight parking spaces and moving flush to a curb, a frequent maneuver for transit buses. While crab mode requires that the several wheels of the vehicle be controlled in unison, the invention allows individual control of each wheel or each pair of wheels, thus permitting a pivot mode, extremely useful for turning especially tight corners or for turning the vehicle completely around in extremely confined spaces.

Figure 13C:
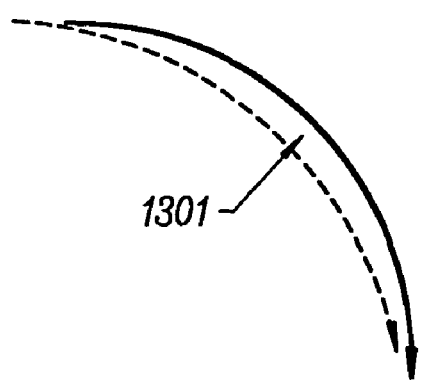

As described further below, multiple vehicles can be coupled to form trains, requiring a "rail" steering (FIG. 13*c*) mode in which successive units in the train tread in the same path as the first unit.

Figure 14:
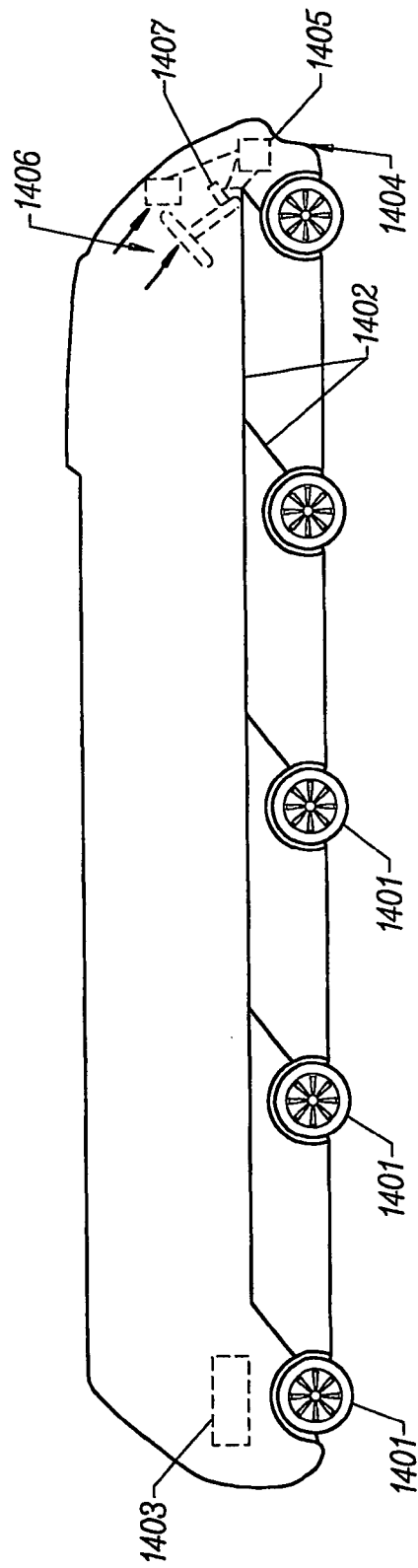
FIG. 14 provides a side elevation a vehicle incorporating an all-wheel steering system, according to the invention.

FIG. 14 illustrates schematically the components of the vehicle's all-wheel steering system. Similar to the suspension, there are wheel components, power sources, cabling, sensors, control elements, and and operator interface:

Wheel components 1401: steering actuator and linkages, shown in greater detail in FIG. 18, required suspension, mechanical support, control arms, body/frame attachments, bearings/bushings, steering sensors;
Sources for actuating forces 1403: hydraulic, pneumatic and electrical;
cabling 1402;
road contour sensor 1404;
controller 1405
a transducer for steering control inputs;
an operator interface 1406; and
a display.

The first axle of the vehicle may also be controlled mechanically through the operator interface.

Figure 15A:
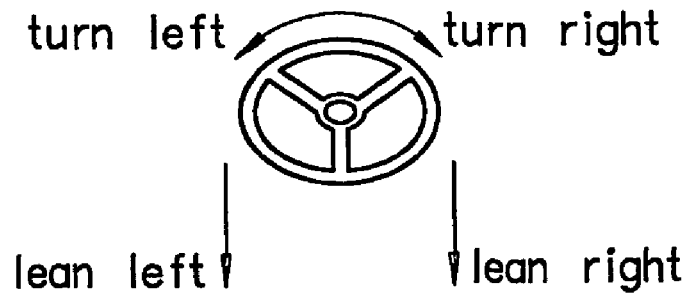
FIG. 15 illustrates a steering control interface for a vehicle as shown in FIG. 14 according to the invention.
Figure 15B:
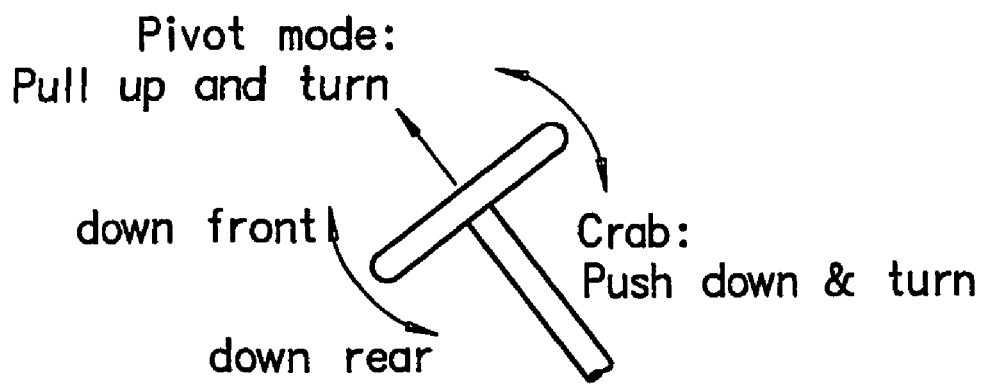

FIG. 15 provides an illustration of the vehicle's steering control interface. While steering could easily be controlled by way of a device such as a joystick, or even a computer pointing device such as a mouse, the preferred embodiment of the invention incorporates steering control functions into a modified steering column to minimize needs for special operator training. The simple interface allows the operator to engage different steering modes such as crab motion or tilting through simple manipulation of the wheel, without removing hands from the wheel to actuate switches or other controls. As FIG. 15 shows, 'pivot mode' is selected by pulling up on the wheel and turning in the appropriate direction. 'Crab mode' is selected by pushing down and turning. Turning is achieved in the conventional fashion, simply by turning the wheel in the desired direction. The height adjusters, for raising and lowering either side of the vehicle, are actuated using 'lean-left' and 'lean right.' The 'feel' of the control is speed sensitive: turn, pivot and crab input forces stiffen with increasing speed, and the lean response increases with speed. The operator pitch input coordinates with the road contour sensor: the suspension controller can be set to anticipate road contours; 'up/down front' and 'up/down rear' anticipate entering humps and dips; and the control computer is informed by inputs from the actual suspension experience, the road contour sensor, and operator input. Control of individual axles or individual wheels is mediated through hydraulic or electric steering control actuators 1801 (FIG. 18) attached to each axle or each wheel.

Figures 16A, 16B:
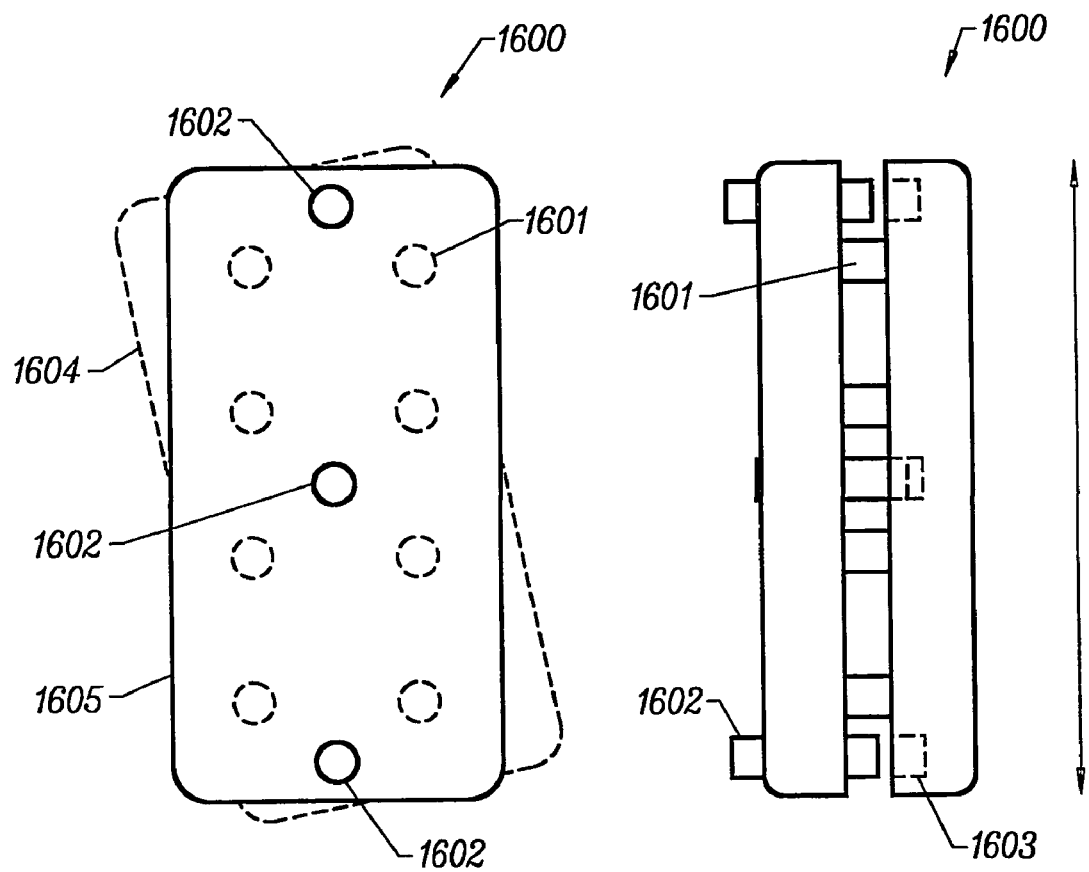
FIG. 16 provides a schematic view of a control transducer from the steering system of FIG. 14 according to the invention.

As shown in FIG. 16, the steering system includes a transducer to translate input from the operator interface to the signals required by the steering actuators. The transducer includes top 1603 and bottom halves 1604 (FIG. 6A) that move relative to each other. Steering mode selection pins 1602 are selectively engaged to set the steering mode. As shown in FIG. 6*b*, the central pin is engaged, allowing the top and bottom halves to twist relative to each other about the center pin, corresponding to 'pivot' mode. When none of the pins are engaged, corresponding to 'crab' mode, the top half moves sideways relative to the bottom half. To steer from the front, the operator engages the bottom pin, so that the top half of the transducer moves freely at the top. To steer the rear of the vehicle, the top pin is likewise engaged. Pushing the halves together evenly lowers suspension height, while drawing them apart raises the suspension. Either side of the vehicle may be raised and lowered by applying uneven force to either side of the transducer. Vehicle pitch is adjusted by twisting the top half of the transducer around a transverse axis relative to the bottom half. Roll is adjusted by twisting the top half of the transducer around a longitudinal axis relative to the bottom half. A transmitter 1603 emits a signal that drives the steering actuators through the mediation of the controller and the signal processor.

Figure 17:
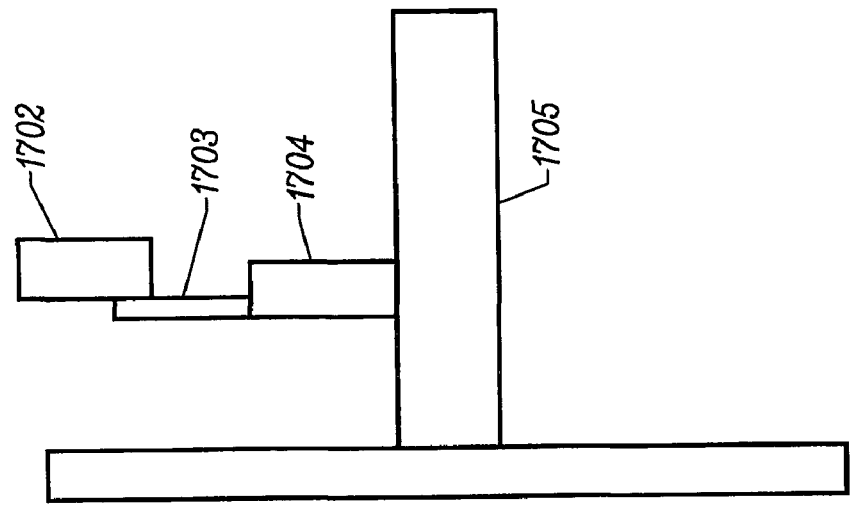
FIG. 17 provides a schematic diagram illustrating coupling of the operator interface to the steering control transducer according to the invention.
Figure 17:
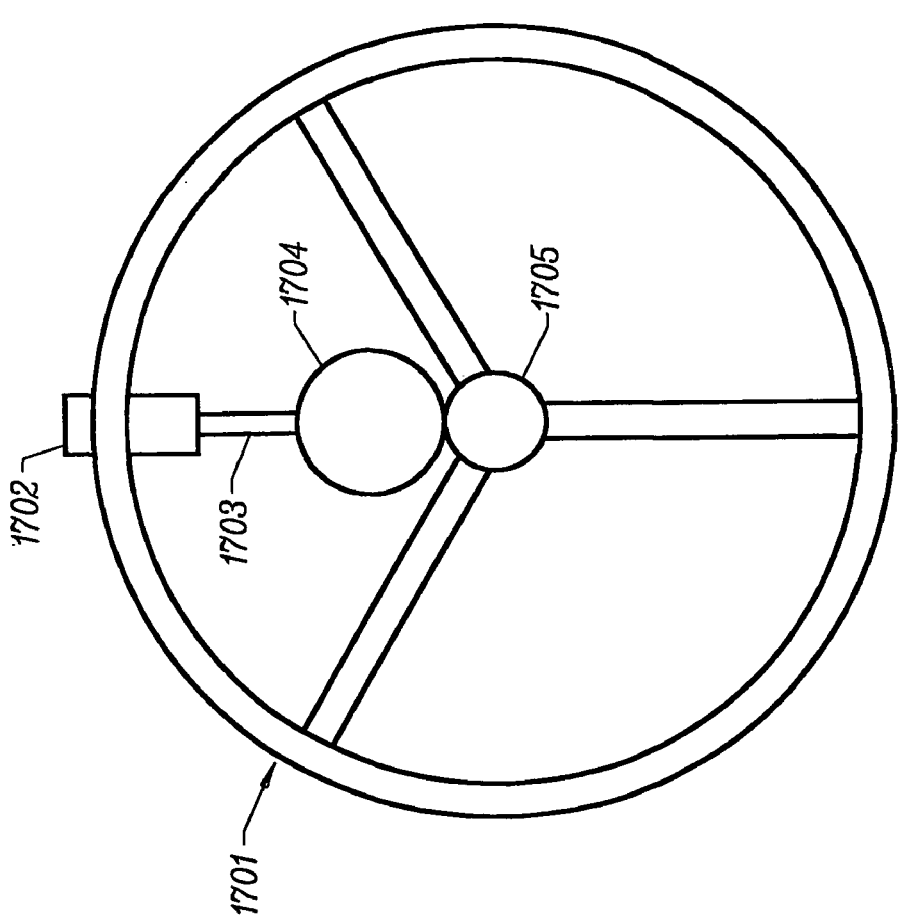

FIG. 17 provides a schematic diagram that illustrates the manner in which the operator interface is coupled to the transducer. The operator interface, in this case a steering wheel 1701 is coupled to the steering control transducer 1702 by means of a reduction gear 1704 and an arm 1703. The reduction gearing allows the steering wheel to retain the conventional feel of turning a steering wheel, shortening training times and facilitating acceptance of the vehicle by operators.

Drive System

As previously described, the vehicle derives its motive force from a hybrid power system that includes electric drive motors, translating members, a power plant for generating the electricity to drive the motors, and storage batteries.

Electric Drive Motor and Drive Shaft

While the preferred embodiment of the invention employs separate wheelmotors for each wheel, as described below, an embodiment incorporating a continuous axle has a single drive motor for each axle, as described immediately hereafter.

The vehicle's drive system includes a high-efficiency electric motor 1803 mounted on each axle, as shown in FIG. 18. Use of high-efficiency drive motors allows the contribution to overall vehicle weight by the motors to be minimized, while maximizing energy efficiency. A differential allows the motor to be run at its most efficient speed while allowing different rotation speeds for the wheels. Additionally, each drive motor 1802 requires a drive motor controller 1803, essentially a collection of very large power transistors that drive each winding on the motor, each controller driven by control software and further provided with diagnostic software. As shown in FIG. 18, the controller is mounted on the axle adjacent the drive motor.

Drive Shaft

It will be remembered that the preferred embodiment of the invention utilizes wheelmotors, a separate one for each wheel, with the axle being integrated into the motor. Accordingly, the preferred embodiment has no need of a drive shaft. However, alternate embodiments employing a continuous axle require a drive shaft as described below.

Power is transmitted to the wheels from the differential through a drive shaft. The drive shaft includes two shafts coming out of either side of the differential, each connected to a CV joint, which is, in turn, connected to a half shaft that is connected to the respective wheel through another CV joint.

Power Plant

Figure 19:
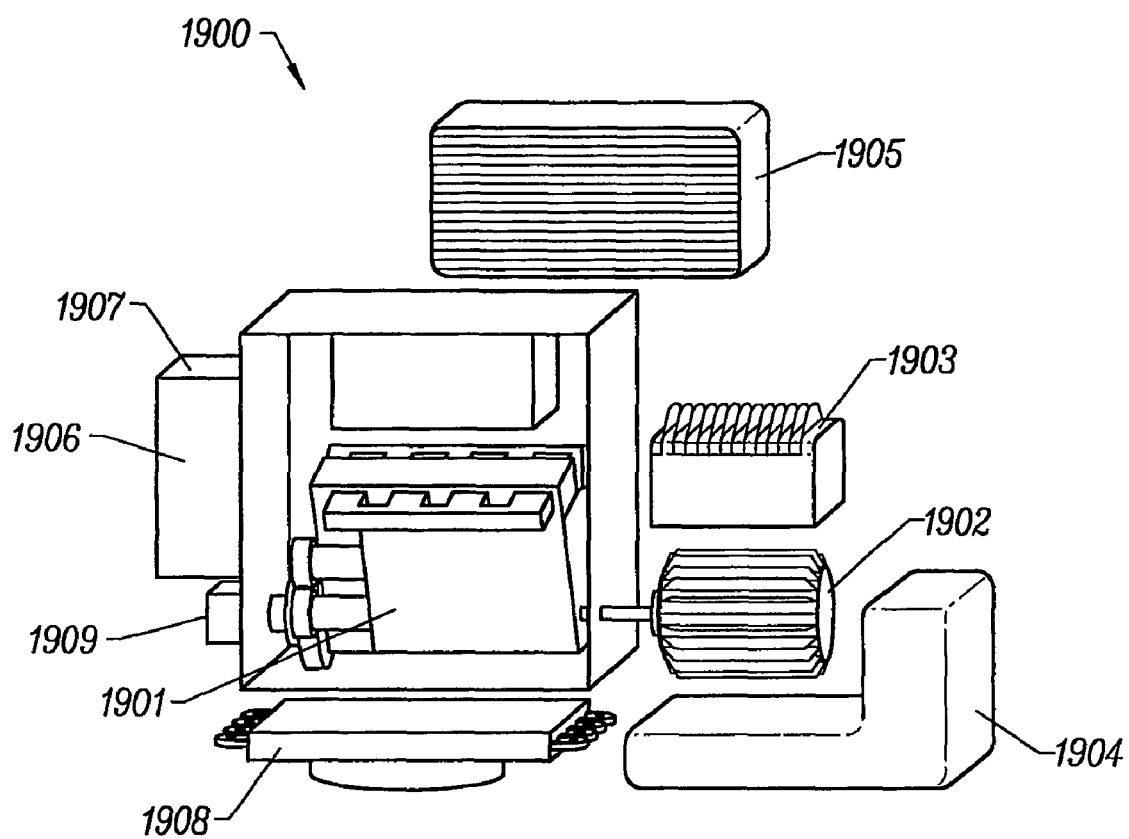
FIG. 19 illustrates a power plant for an urban mass transit vehicle as shown in FIG. 1, according to the invention.

The major components of the vehicle's power plant 1900 are shown in FIG. 19. The entire system is mounted in the rear section of the vehicle. The power system includes:

an engine (1901)—The engine is the basic power source for the vehicle. The current embodiment of the invention includes an internal combustion engine. The vehicle preferably uses an environmentally friendly fuel such as natural gas or liquid propane. However, due to the high fuel economy of the vehicle owing in part to the hybrid-electric power system, even an internal combustion engine employing conventional petroleum fuels such as gasoline or Diesel fuel greatly minimizes the deleterious environmental effects caused by fuel emissions. Moreover, embodiments of the invention powered by alternative energy sources such as fuel cells or hydrogen are also possible;

a fuel tank (1904);

a generator (1902): power from the engine is converted to electricity via the generator. The generator is attached directly to the engine's drive shaft;

a generator controller (1903): the generator requires a control element to capture generated electricity properly and to control battery charging in concert with a corresponding controller in each battery pack;

a cooling system for the engine (1908);

a hydraulic unit (1906): a hydraulic pump and controller are connected directly to the drive shaft of the engine. This unit provides hydraulic power, at least for the height adjuster system, the steering and braking systems;

a pneumatic unit (1909): an air compressor and controller are connected directly to the drive shaft of the engine. This unit provides compressed air, at least for the air spring system, and to a pneumatically powered height adjuster as an alternative to the hydraulic power system for the height adjuster system, and other ancillary vehicle subsystems.

an engine box (1907); and a climate control unit for passenger areas (1905).

Battery Packs

Figure 20:
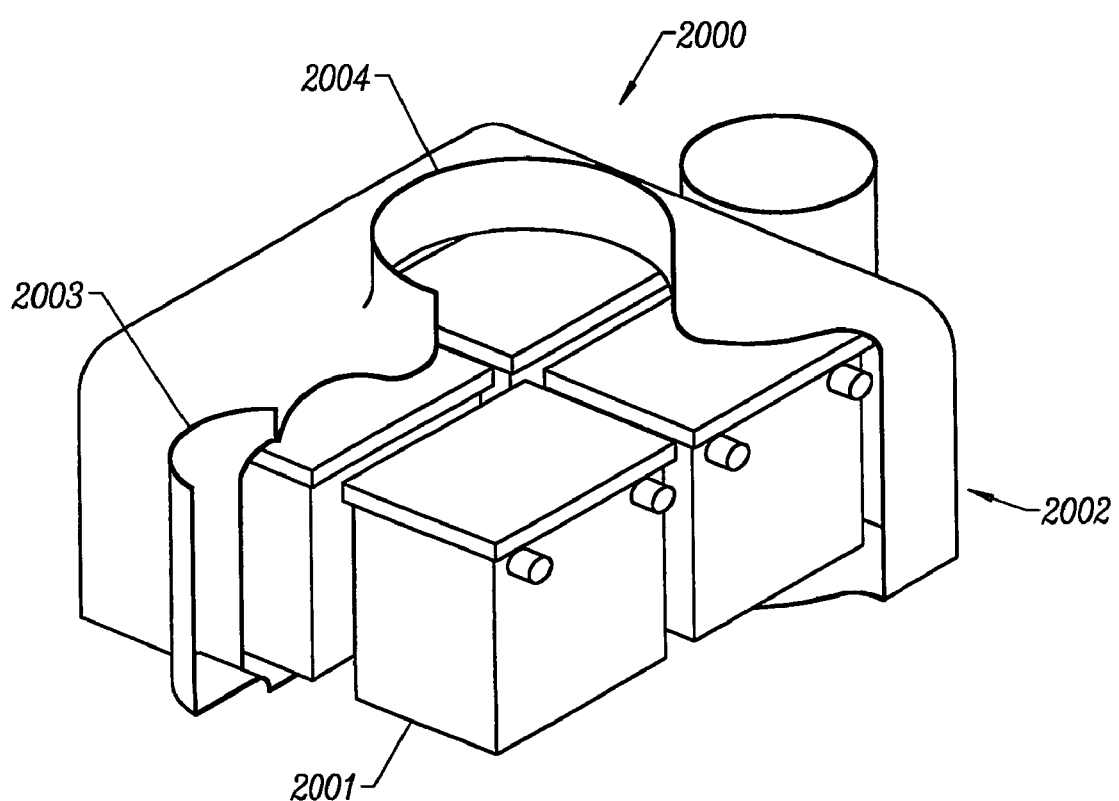
FIG. 20 shows a battery pack for an urban mass transit vehicle as shown in FIG. 1, according to the invention.

The power system requires a number of storage batteries positioned at regular intervals about the vehicle; in the preferred embodiment of the invention the battery packs are situated over the axles (i.e., in the body between pairs of opposing wheels on opposing sides of the vehicle), including the first and last axles. FIG. 20 shows a battery pack 2000 having a number of batteries 2001. Four batteries are shown in FIG. 20; however, this is merely for the sake of illustration. The actual number of batteries may vary according to battery capacity and vehicle power requirements. The batteries generate a significant amount of heat, requiring the provision of an inlet vent 2004 in the battery pack housing 2002 to cool the batteries. Because the batteries may create fumes that are potentially hazardous, the battery pack is vented to the outside environment b y means of one or more outlet vents 2003. Each battery pack also contains an electronic controller that controls charging, monitors health of the battery pack, and communicates with the generator controller.

System Command & Control Computer

As previously mentioned, control of many of the vehicle's systems is processor-mediated: the suspension, the all-wheel steering system, and the hybrid power system. In some cases, control is by means of local controllers, the power plant for example. Some of the vehicle systems may accept a variety of inputs. The vehicle includes other control systems not previously described:

- a door system controller;
- a fare system;
- a security system;
- a climate control system; and
- a communication system.

Thus, a central command and control system is required to control and mediate the interaction of the various system controllers.

Coupling Several Vehicles to Form Trains

Figure 21:
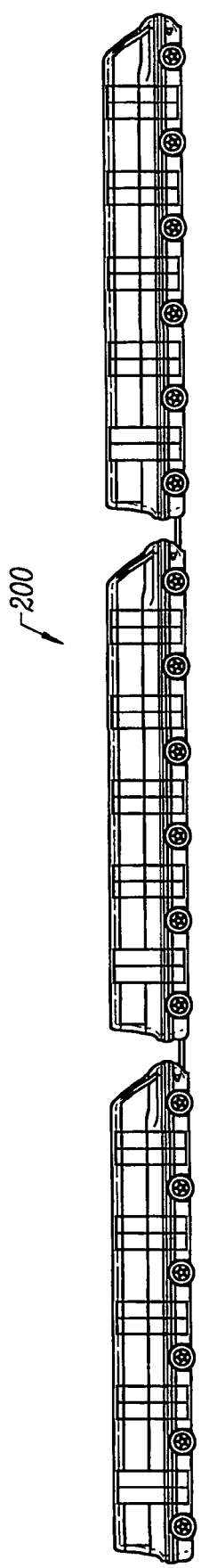
FIG. 21 illustrates a plurality of urban mass transit vehicles coupled end-to-end to form a train according to the invention.

As FIG. 21 shows, several vehicles may be combined to form trains 2100. The train is made possible by the vehicle's control system, including controls for steering, suspension, propulsion, and passenger needs. Requiring primarily linkage of the control systems of individual units into coordinated units of a train (and not links to provide inter-unit towing or mechanical guiding forces), buses may be linked and de-linked very rapidly. The bus train provides the advantage of carrying as much passenger traffic as a train of light rail vehicles without requiring the infrastructure scale of a light rail system. The bus train requires essentially no infrastructure other than passable roadways such as principal streets or boulevards in major urban areas, i.e., roadways that lack extremely tight turns. A train of these bus units may pass wherever a single unit can since the vehicle's steering control allows successive units in a train to tread in the same track as the first unit over the road. A bus train is driven by one driver, thus, a single driver can transport at several times the number of passengers as in a single vehicle, enabling a significant reduction in labor cost.

For operation as part of a train, the steering systems of successive units are set in 'rail mode,' (FIG. 13c) in which the wheels behave as if they were on rails, treading in the same path on the roadway as those of the first unit, instead of cutting 1301, as conventional trailing wheels do. The additional data required by the steering control system to operate in 'rail mode' are relatively minor—the distance from the first axle of the first unit to the first axle in the second unit, and so forth. In 'cattle car' mode, common in current mass transit vehicles, multiple doors make it possible to accommodate approximately 20 passengers per door, at least for short distances, or 80 passengers per 4-compartment bus and 240 passengers per 3-unit train. For high volume routes having straight streets, 5-unit trains are practical.

Although the invention has been described herein with reference to certain preferred embodiments, one skilled in the art will readily appreciate that other applications may be substituted for those set forth herein without departing from the spirit and scope of the present invention. Accordingly, the invention should only be limited by the claims included below.

The invention claimed is:

1. A vehicle, said vehicle comprising:
    at least two substantially identical cells, each cell having two ends and two opposing sides, a bottom surface and a top surface; each cell comprising:
        a body section;
        at least one pair of wheels, one wheel on each of said opposing sides;
        an axle for each wheel, said wheel coupled to said axle;
        an independent, active suspension for each wheel, wherein said suspensions couple said axles to said bottom surface of said body section, said suspensions being microprocessor-controllable in response to operator input and roadway conditions;
        a drive motor fixedly attached to said axle, wherein motive force is translated from said drive motor to said wheels;
    wherein said cells are assembled end-to-end such that a rigid vehicle body structure is formed;
    a steering system, wherein all of said wheels are operative to steer said vehicle, said steering system being microprocessor-controllable;
    a power plant for generating power and supplying said power to said drive motors; and
    one or more microprocessor control means for centrally controlling at least said suspensions and said steering system;
    wherein providing multiple pairs of suspensions closely spaced reduces load requirements for said vehicle structure, so that suspensions for said transit vehicle are manufacturable from lightweight, stock parts.

2. A vehicle as in claim 1, said axle comprising one of:
    an independent axle for each wheel; and
    an end of a continuous axle having two opposing ends, said axle disposed such that said ends are at said opposing sides.

3. A vehicle as in claim 1, further comprising a front unit and an end unit, each of said front unit and said end unit being formed by modifying one of said cells.

4. A vehicle as in claim 1, said vehicle at least partially fabricated from lightweight materials.

5. A vehicle as in claim 4, wherein said lightweight materials include:
    lightweight metal products; and
    composite materials.

6. A vehicle as in claim 1, wherein said active suspension comprises:
    a height adjuster;
    an active air spring system;
    an active shock absorber for damping motions of wheels under forces exerted by road surface contours and by said air spring system; and
    a ride bumper, said ride bumper sitting between said body and said axle.

7. A vehicle as in claim 6, wherein said height adjustor comprises one of:
   a system of mechanical guides and force applicators to effect vertical adjustment of each axle relative to the vehicle body; and
   a system of mechanical guides and force applicators to effect independent vertical adjustment of each end of a continuous axle relative to the vehicle body.

8. A vehicle as in claim 7, wherein said height adjustor attaches said axle to an undersurface of said floor, so that said axle can move up and down when actuated by said system of mechanical guides and force applicators.

9. A vehicle as in claim 6, wherein a height adjustor is controlled independently of any other height adjuster.

10. A vehicle as in claim 6, said active air spring system comprising:
    an air spring;
    a plenum, said air spring in communication with said plenum;
    a plurality of progressive fast acting valves disposed at intervals in said plenum, wherein total volume of air in said air spring system is varied by sequentially opening and closing said progressive valves.

11. A vehicle as in claim 10, wherein said valves comprise valve plates rotated by a common shaft at angular intervals.

12. A vehicle as in claim 10, wherein spring stiffness is inversely related to available system volume.

13. A vehicle as in claim 10, wherein force exerted by said spring system remains constant as stiffness varies.

14. A vehicle as in claim 6, said active shock absorber comprising:
    a hydraulic fluid canister mounted to a top bearing plate of said spring;
    a shaft having a first and second end, said first end attached to a lower bearing plate of said spring, said second end received by a central opening in a bottom face of said canister and wherein said shaft traverses a volume of said canister axially;
    a valve stem, said valve stem emerging from a central opening in a top face of said canister, wherein said stem receives said second end of said shaft and surrounds said shaft concentrically;
    a pusher plate, said pusher plate concentrically attached to said shaft such that said pusher plate is stationary and incapable of rotating;
    a valve plate assembly, said valve plate assembly continuous with said valve stem, said valve plate assembly including at least two valve plates, said valve plates stationary with respect to each other, said valve plate assembly and said valve stem comprising a valve assembly;
    wherein said pusher plate is sandwiched between said valve plates, and wherein said valve assembly rotates freely with respect to said pusher plate and said shaft.

15. A vehicle as in claim 14, wherein said valve plates and said pusher plate define a plurality of openings, and wherein openings in said valve plates are aligned with each other.

16. A vehicle as in claim 15, wherein alignment of valve plate openings with pusher plate openings is adjusted by rotating said valve assembly with respect to said pusher plate.

17. A vehicle as in claim 16, wherein fluid flow between compartments of said canister is regulated by setting alignment of said openings, and wherein said valve plates move through said fluid in piston-like fashion.

18. A vehicle as in claim 17, wherein obstructing fluid flow stoppers said shock absorber and prevents movement of said plates so that a maximum amount of damping is provided.

19. A vehicle as in claim 17, wherein degree of damping provided by said shock absorber is determined by alignment of openings.

20. A vehicle as in claim 17, further comprising an actuator, wherein said valve stem is connected to said actuator, and wherein said actuator rotates said valve stem to set alignment of said openings.

21. A vehicle as in claim 20, wherein said actuator is responsive to input from a control element.

22. A vehicle as in claim 14, wherein said shock absorber is operative to inhibit downward movement of said wheel.

23. A vehicle as in claim 1, said steering system comprising:
    a steering control interface;
    an all-wheel steering assembly; and
    a steering actuator attached to each axle, wherein said axles are steerable in unison, or individually steerable.

24. A vehicle as in claim 23, said steering control interface including:
    an operator interface; and
    a control element, wherein said control element translates input from said operator interface to said steering actuators.

25. A vehicle as in claim 24, said operator interface comprising a steering column with steering wheel, said control element comprising a transducer, wherein said wheel is coupled to said transducer by means of a reduction gear.

26. A vehicle as in claim 24, wherein said operator interface comprising one of:
    a joy stick; and
    a computer pointing device.

27. A vehicle as in claim 24, wherein said steering system provides a plurality of all-wheel steering modes.

28. A vehicle as in claim 27, wherein said modes include;
    conventional steering mode;
    pivot mode;
    crab mode; and
    rail mode.

29. A vehicle as in claim 27, wherein an operator engages at least some of said modes by turning and manipulating said wheel with a minimum of additional control operations.

30. A vehicle as in claim 27, wherein an operator actuates a height adjuster system to raise and lower either side of said vehicle by manipulating said wheel.

31. A vehicle as in claim 24, wherein said control element is in communication with said steering actuators, and wherein control of individual axles is mediated by said steering actuators.

32. A vehicle as in claim 1, wherein said drive motor comprises one of:
    a wheel motor, wherein an outer element rotates with a wheel and an inner element is fixed to an axle; and
    a motor mounted to the vehicle inboard of the wheel, wherein power is delivered to the wheel by means of at least one translating members.

33. A vehicle in claim 1, wherein said drive motor comprises a high-efficiency electric motor.

34. A vehicle as in claim 32, said drive motor and said power plant together comprising a drive system, said drive system further comprising at least one battery pack.

35. A vehicle as in claim 34, wherein said drive motor powers a pair of wheels on opposing sides of the vehicle, said drive motor system further comprising a differential, said differential allowing said motor to be run at an efficient speed while allowing different rotation speeds for wheels.

36. A vehicle as in claim 34, said drive motor further comprising a drive motor controller, said drive motor controller in communication with said power plant, said controller driven by control software, said controller further including diagnostic software.

37. A vehicle as in claim 34, said translating member comprising a drive shaft, said drive shaft translating power to said wheels from said differential, said drive shaft comprising a shaft, a first end of said shaft communicating with said differential, a second end of said shaft communicating with a first side of a first CV joint, a half shaft communicating with a second side of said first CV joint, said half shaft connected to said wheel by means of a second CV joint.

38. A vehicle as in claim 34, said power plant comprising:
an engine, said engine serving as a basic power source for said vehicle;
a fuel tank;
a generator, wherein power from said engine is converted to electricity, said generator communicating with a drive shaft on said engine;
a generator controller to control capture of electricity and communicating with controllers on individual battery packs to coordinate charging of said battery packs;
an engine cooling system;
a hydraulic unit, said hydraulic unit providing hydraulic power to height adjustment, steering and braking systems;
a pneumatic unit, said pneumatic unit providing pneumatic power to at least said suspension;
an engine box; and
a climate control system for passenger areas.

39. A vehicle as in claim 38, wherein said engine comprises any of an internal combustion engine and a fuel cell engine.

40. A vehicle as in claim 38, wherein said engine utilizes for fuel one of:
gasoline;
diesel fuel;
propane;
natural gas; and
hydrogen.

41. A vehicle as in claim 34, said battery packs disposed in spaces of said vehicle body between each pair of wheels on opposing sides of the body, a battery pack including:
a battery pack housing;
a plurality of storage batteries contained within said housing;
at least one intake vent for cooling said batteries;
at least one output vent for venting exhaust gases from said batteries; and
at least one battery controller, said battery controller in communication with a generator controller.

42. A vehicle as in claim 1, further comprising a central control element, said control element operative to control and mediate operation and interaction of vehicle sub-systems and controllers.

43. A vehicle as in claim 1, wherein several vehicles are combined to form a train.

44. A suspension system for a multi-axle vehicle comprising:
a suspension for each wheel of said vehicle, a suspension comprising:

a height adjuster;
an active air spring system for maintaining body of said vehicle level relative to irregularities in a road surface;
an active shock absorber for damping forces exerted by said air spring system; and
a control element for independently controlling each of said suspensions in response to operator input and roadway conditions,
wherein said vehicle includes at least three evenly spaced pairs of wheels, one on each of opposing sides of the vehicle, each wheel mounted on an axle, said suspensions coupling said axles to an undersurface of said vehicle body, wherein providing said suspensions closely spaced reduces load requirements for structure of said vehicle.

45. A suspension as in claim 44, said axle comprising one of:
an independent axle for each wheel; and
an end of a continuous axle having two opposing ends, said axle disposed such that said ends are at said opposing sides.

46. A suspension as in claim 44, further comprising a ride bumper, said ride bumper sitting between the wheel body and an axle.

47. A suspension as in claim 44, wherein said height adjustor comprises one of:
a system of mechanical guides and force applicators to effect vertical adjustment of each axle relative to the vehicle body; and
a system of mechanical guides and force applicators to effect independent vertical adjustment of each end of a continuous axle relative to the vehicle body.

48. A suspension as in claim 47, wherein said height adjustor attaches said axle to an undersurface of said floor, so that said axle can move up and down when actuated by said system of mechanical guides and force applicators.

49. A suspension as in claim 47, wherein a height adjustor is controlled independently of any other height adjuster.

50. A suspension as in claim 44, said active air spring system comprising:
an air spring;
a plenum, said air spring in communication with said plenum;
a plurality of progressive fact acting valves disposed at intervals in said plenum, wherein total volume of air in said air spring system is varied by sequentially opening and closing said progressive valves.

51. A suspension as in claim 50, wherein said valves comprise valve plates rotated by a common shaft at angular intervals.

52. A suspension as in claim 50, wherein spring stiffness is inversely related to available system volume.

53. A suspension as in claim 50, wherein force exerted by said spring system remains constant as stiffness varies.

54. A suspension as in claim 44, said active shock absorber comprising:
a hydraulic fluid canister mounted to a top bearing plate of said spring;
a shaft having a first and second end, said first end attached to a lower bearing plate of said spring, said second end received by a central opening in a bottom face of said canister and wherein said shaft traverses a volume of said canister axially;

a valve stem, said valve stem emerging from a central opening in a top face of said canister, wherein said stem receives said second end of said shaft and surrounds said shaft concentrically;

a pusher plate, said pusher plate concentrically attached to said shaft such that said pusher plate is stationary and incapable of rotating;

a valve plate assembly, said valve plate assembly continuous with said valve stem, said valve plate assembly including at least two valve plates, said valve plates stationary with respect to each other, said valve plate assembly and said valve stem comprising a valve assembly;

wherein said pusher plate is sandwiched between said valve plates, and wherein said valve assembly rotates freely with respect to said pusher plate and said shaft.

55. A suspension as in claim 54, wherein said valve plates and said pusher plate define a plurality of openings, and wherein openings in said valve plates are aligned with each other.

56. A suspension as in claim 55, wherein alignment of valve plate openings with pusher plate openings is adjusted by rotating said valve assembly with respect to said pusher plate.

57. A suspension as in claim 56, wherein fluid flow between compartments of said canister is regulated by setting alignment of said openings, and wherein said valve plates move through said fluid in piston-like fashion.

58. A suspension as in claim 57, wherein obstructing fluid flow stoppers said shock absorber and prevents movement of said plates so that a maximum amount of damping is provided.

59. A suspension as in claim 57, wherein degree of damping provided by said shock absorber is determined by alignment of openings.

60. A suspension as in claim 57, further comprising an actuator, wherein said valve stem is connected to said actuator, and wherein said actuator rotates said valve stem to set alignment of said openings.

61. A suspension as in claim 60, wherein said actuator is responsive to input from a control element.

62. A suspension as in claim 54, wherein said shock absorber is operative to inhibit downward movement of said wheel.

63. A multi-axle vehicle, comprising:

a vehicle body;

at least three evenly spaced pairs of wheels, one on each of opposing sides of the vehicle, each wheel mounted on an axle;

a suspension provided for each wheel, said suspensions coupling said axles to an undersurface of said vehicle body, wherein providing said suspensions closely spaced reduces load requirements for structure of said vehicle, said suspension comprising:

a height adjuster;

an active air spring system for maintaining body of said vehicle level relative to irregularities in a road surface; and an active shock absorber for damping forces exerted by said air spring system; and a processor-mediated control element for independently controlling each of said suspensions in response to operator input and roadway conditions.

64. A vehicle as in claim 63, said axle comprising one of:

an independent axle for each wheel; and an end of a continuous axle having two opposing ends, said axle disposed such that said ends are at said opposing sides.

65. A vehicle as in claim 63, further comprising a ride bumper, said ride bumper sitting between the wheel body and an axle.

66. A vehicle as in claim 63, wherein said height adjustor comprises one of:

a system of mechanical guides and force applicators to effect vertical adjustment of each axle relative to the vehicle body; and a system of mechanical guides and force applicators to effect independent vertical adjustment of each end of a continuous axle relative to the vehicle body.

67. A vehicle as in claim 66, wherein said height adjustor attaches said axle to an undersurface of said floor, so that said axle can move up and down when actuated by said system of mechanical guides and force applicators.

68. A vehicle as in claim 66, wherein a height adjustor is controlled independently of any other height adjuster.

69. A vehicle as in claim 63, said active air spring system comprising:

an air spring;

a plenum, said air spring in communication with said plenum;

a plurality of progressive fast acting valves disposed at intervals in said plenum, wherein total volume of air in said air spring system is varied by sequentially opening and closing said progressive valves.

70. A vehicle as in claim 69, wherein said valves comprise valve plates rotated by a common shaft at angular intervals.

71. A vehicle as in claim 69, wherein spring stiffness is inversely related to available system volume.

72. A vehicle as in claim 69, wherein force exerted by said spring system remains constant as stiffness varies.

73. A vehicle as in claim 63, said active shock absorber comprising:

a hydraulic fluid canister mounted to a top bearing plate of said spring;

a shaft having a first and second end, said first end attached to a lower bearing plate of said spring, said second end received by a central opening in a bottom face of said canister and wherein said shaft traverses a volume of said canister axially;

a valve stem, said valve stem emerging from a central opening in a top face of said canister, wherein said stem receives said second end of said shaft and surrounds said shaft concentrically;

a pusher plate, said pusher plate concentrically attached to said shaft such that said pusher plate is stationary and incapable of rotating; a valve plate assembly, said valve plate assembly continuous with said valve stem, said valve plate assembly including at least two valve plates, said valve plates stationary with respect to each other, said valve plate assembly and said valve stem comprising a valve assembly;

wherein said pusher plate is sandwiched between said valve plates, and wherein said valve assembly rotates freely with respect to said pusher plate and said shaft.

74. A vehicle as in claim 73, wherein said valve plates and said pusher plate define a plurality of openings, and wherein openings in said valve plates are aligned with each other.

75. A vehicle as in claim 74, wherein alignment of valve plate openings with pusher plate openings is adjusted by rotating said valve assembly with respect to said pusher plate.

76. A vehicle as in claim 75, wherein fluid flow between compartments of said canister is regulated by setting alignment of said openings, and wherein said valve plates move through said fluid in piston-like fashion.

77. A vehicle as in claim 76, wherein obstructing fluid flow stoppers said shock absorber and prevents movement of said plates so that a maximum amount of damping is provided.

78. A vehicle as in claim 76, wherein degree of damping provided by said shock absorber is determined by alignment of openings.

79. A vehicle as in claim 76, further comprising an actuator, wherein said valve stem is connected to said actuator, and wherein said actuator rotates said valve stem to set alignment of said openings.

80. A vehicle as in claim 79, wherein said actuator is responsive to input from a control element.

81. A vehicle as in claim 73, wherein said shock absorber is operative to inhibit downward movement of said wheel.

* * * * *